(12) United States Patent
Osawa et al.

(10) Patent No.: US 7,839,458 B2
(45) Date of Patent: Nov. 23, 2010

(54) LIQUID CRYSTAL OPTICAL ELEMENT HAVING GROUPED CONCENTRIC ELECTRODES

(75) Inventors: Seiichi Osawa, Oyama (JP); Shinya Sato, Koganei (JP); Masayuki Iwasaki, Fujimino (JP); Takeshi Toyoda, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 544 days.

(21) Appl. No.: 11/885,180

(22) PCT Filed: Feb. 17, 2006

(86) PCT No.: PCT/JP2006/302847
§ 371 (c)(1),
(2), (4) Date: Aug. 28, 2007

(87) PCT Pub. No.: WO2006/092968
PCT Pub. Date: Sep. 8, 2006

(65) Prior Publication Data
US 2008/0266473 A1   Oct. 30, 2008

(30) Foreign Application Priority Data
Mar. 3, 2005 (JP) ............... 2005-059304
Mar. 3, 2005 (JP) ............... 2005-059305

(51) Int. Cl.
*G02B 1/13* (2006.01)
*G11B 7/135* (2006.01)
(52) U.S. Cl. ............... 349/2; 349/200; 369/112.02
(58) Field of Classification Search ............... 349/2, 349/200, 201, 202; 369/112.02
See application file for complete search history.

(56) References Cited

U.S. PATENT DOCUMENTS 6,480,454 B1 * 11/2002 Wada et al. ............ 369/112.02

(Continued)

FOREIGN PATENT DOCUMENTS

EP   1 136 993 A1   9/2001

(Continued)

OTHER PUBLICATIONS

Chinese Office Action dated Dec. 19, 2008.

*Primary Examiner*—Michael H Caley
(74) *Attorney, Agent, or Firm*—Sughrue Mion, PLLC

(57) ABSTRACT

A first electrode of a liquid crystal cell (21) is composed of a plurality of concentric electrodes (31 to 34) of a concentrically circular shape, the plurality of concentric electrodes are divided into a first group of concentric electrodes (44) near the center and a second group of concentric electrodes (45) near the periphery, and a concentric electrode between the two groups is an independent single electrode (36). A first correction unit that corrects spherical aberration of a high density DVD is composed of the two groups and a second correction unit that corrects aberration of a conventional DVD is composed of the first group of concentric electrodes (44). In the case of correcting the aberration of the conventional DVD, the independent concentric electrode (36) is supplied with a voltage between the voltages respectively supplied to adjacent concentric electrodes (35), (37). In the case of correcting the aberration of the high density DVD, the independent concentric electrode (36) is supplied with a voltage equal to the voltage supplied to the concentric electrode immediately lateral thereto (37).

52 Claims, 14 Drawing Sheets

U.S. PATENT DOCUMENTS

2001/0028028 A1* 10/2001 Iwasaki et al. ............... 250/216
2005/0047311 A1* 3/2005 Sato et al. ............... 369/112.02

FOREIGN PATENT DOCUMENTS

| JP | 10-269611 A | 10/1998 |
| JP | 3047082 B2 | 3/2000 |
| JP | 2002-14314 A | 1/2002 |
| JP | 2002-56559 A | 2/2002 |
| JP | 2004-178773 A | 6/2004 |
| JP | 2004-334031 A | 11/2004 |
| JP | 2005-71424 A | 3/2005 |
| WO | 01 18801 A1 | 3/2001 |

* cited by examiner

LIQUID CRYSTAL OPTICAL ELEMENT HAVING GROUPED CONCENTRIC ELECTRODES

TECHNICAL FIELD

The present invention relates to a liquid crystal optical element, and more particularly, to a liquid crystal optical element that makes correction of a fluctuation, a distortion, an aberration, etc., produced in a light wave-front when a light flux passes through a lens and is condensed.

BACKGROUND ART

Conventionally, optical disks such as a CD (compact disk) and DVD (digital versatile disk) are used as a medium for recording music data, video data, etc. An optical disk device condenses a laser light by a lens and irradiates it onto a data recording layer of an optical disk and, by detecting the light reflected thereby, reads out recorded data of the optical disk. An infrared laser light of a wavelength on the order of 780 nm and an objective lens with a numerical aperture on the order of 0.45 to 0.51 are used in reading out the recorded data of the CD.

On the other hand, with respect to the DVD, since the data is recorded at the density higher than that of the CD, a red laser light of shorter wavelength, for example, on the order of 660 nm and the objective lens with numerical aperture on the order of 0.65 are used. The CD and the DVD differ in depth from the surface on the side of the disk on which the laser light is irradiated to a data recording layer. Therefore, the optical disk device having compatibility for both of the CD and the DVD is required to have laser light sources of different wavelengths and different optical systems such as objective lens, for the CD and the DVD, respectively.

Ordinarily, however, a common optical system such as objective lens is used for the CD and the DVD, with a view to cost reduction and miniaturization of the optical disk device. For this reason, the optical system optimized for the CD (for the DVD) produces aberration for the DVD (or the CD). Therefore, the optical disk device having compatibility for the CD and the DVD is required to correct this aberration.

A mass-storage DVD having two data recording layers is on the market. With such a DVD, since the depth from the surface on the side of the disk on which the laser light is irradiated to the data recording layer is different between the data recording layers, there is no problem with the data recording layer for which the optical system is optimized, but spherical aberration is produced with respect to other data recording layer. Even with an ordinary single-layer optical disk such as the DVD and the CD, if the thickness of the disk varies, the depth from the surface on the side of the disk on which the laser light is irradiated to the data recording layer varies and the spherical aberration is produced.

In recent years, in accordance with development of a blue semiconductor laser, a next-generation optical disk and optical disk device are developed that has the recording density further enhanced by use of a blue laser light. However, since the spherical aberration is inversely proportional to the wavelength of the laser light, how to correct the spherical aberration becomes an important problem for such a next-generation optical disk device.

In the case of using the blue laser light, since the numerical aperture of the objective lens is 0.85, the effective aperture of the objective lens becomes large, as compared with the case of conventional CD and DVD using the infrared or red laser light. The position of the peak of the produced spherical aberration in the direction of the lens radius differs between the case of using the blue laser light and the case of using the infrared laser light or the red laser light. This situation is shown in FIG. 20. In FIG. 20, a horizontal axis and a vertical axis represent a distance (normalized) from the center of the objective lens in its radius direction and a produced spherical aberration volume (normalized), respectively. W-shaped curves in a solid line and a dashed line represent two-dimensionally the aberration in the case of using the blue laser light and the aberration in the case of using the red laser light, respectively.

As is apparent from FIG. 20, the effective aperture of the objective lens and the position of the peak of the produced aberration largely differ between the case of using the blue laser light and the case of using the red laser light. The case is the same when the produced aberration takes an M-shape curve, with the W-shape curve of FIG. 20 being reversed around the horizontal axis. Therefore, to ensure compatibility among the cases of using the blue laser light, the infrared laser light, and the red laser light with a common configuration of the optical system such as the objective lens, it is also an important problem how to solve the difference in the numerical aperture and the effective aperture, and the difference in the peak position of the spherical aberration, which depend on the difference in the wavelength of the laser light used.

Publicly known is a focusing mechanism that changes a focal distance or focal position of the optical system, having a liquid crystal layer, transparent substrates that sandwich the liquid crystal layer, a voltage drop resistor provided on a first of the transparent substrates from its center toward its periphery, a plurality of concentric electrodes provided on the first of the transparent substrates and connected to the voltage drop resistor, extraction electrodes for applying voltage across the voltage drop resistor, a lower electrode provided on a second of the transparent substrates for applying an electric field to the liquid crystal layer between itself and the concentric electrodes, and a power source for applying voltage to the extraction electrode and the lower electrode (see, for example, Patent Reference 1). According to the Patent Reference 1, by appropriately determining the width of the voltage drop resistor, the focal position at which the image is formed by the focusing mechanism can be made variable.

Publicly known is an optical pickup for reading out data from the DVD having a plurality of data recording layers, including a wave front aberration correcting unit located in a light path between a light source and an objective lens that corrects wave front aberration of the light projected from the light source dependent on the data recording layer selected, the wave front aberration correcting unit being composed of a liquid crystal element (see, for example, Patent Reference 2). According to the Patent Reference 2, correction can be made of the wave front aberration produced by a difference in distance between the recording layer for which the optical pickup is optimally designed and each of the other recording layers.

Patent Reference 1: Japanese Patent Publication No. 3047082

Patent Reference 2: Japanese Patent Application Laid-Open Publication No. 1998-269611

DISCLOSURE OF INVENTION

Problem to be Solved by the Invention

By applying the focusing mechanism described in Patent Reference 1, a wave front aberration volume can be adjusted for each of a CD, a DVD having a single data recording layer, and a DVD having a plurality of data recording layers. The optical pickup described in Patent Reference 2 can correct spherical aberration produced on data recording layers other than a data recording layer for which the optical pickup is optimally designed. However, neither of them can solve the difference in the effective aperture of the objective lens and the difference in the peak position of the spherical aberration due to the difference in the wavelength of the laser light.

Means for Solving Problem

To solve the problems of conventional technologies described above, an object of the present invention is to provide a liquid crystal optical element that can solve the problem arising from the difference in the effective aperture of the objective lens when irradiating various types of laser lights including a blue laser light onto optical disks and the difference in the peak position of the spherical aberration produced in respective cases.

To solve the above problems and achieve an object of the present invention, a liquid crystal optical element according to one aspect of the present invention includes a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, the plurality of concentric electrodes are grouped into at least two groups of concentric electrodes, among the concentric electrodes belonging to each group of concentric electrodes, the concentric electrodes that are adjacent to each other are connected through a resistor, and the concentric electrodes at each end of the concentric electrodes belonging to each group of concentric electrodes are connected to the power source unit through an extraction electrode.

According to the present invention, generation of an aberration having a phase nearly opposite (hereinafter, correction aberration) to that of the aberration produced without correction being made by the liquid crystal optical element (hereinafter, simply, produced aberration), is enabled by applying appropriate voltages, according to the laser light used, to the concentric electrodes of the first electrode. Therefore, according to the present invention, reduction of the aberration after correction by the liquid crystal optical element (hereinafter, residual aberration) is enabled.

Further, in the liquid crystal optical element according to the present invention an independent concentric electrode of a circular shape concentric with the concentric electrodes is further provided on the first transparent substrate, independently without belonging to any group of concentric electrodes, and the independent concentric electrode is connected to the power source unit through an extraction electrode. According to the present invention, by variation of the voltage applied to the independent concentric electrode, the peak position of the correction aberration can be matched to the produced aberration peak position which varies according to the laser light used.

Furthermore, in the liquid crystal optical element according to the present invention, the independent concentric electrode is provided between a first group of concentric electrodes that is near a center of the liquid crystal cell and a second group of concentric electrodes that is near a periphery of the liquid crystal cell. According to the present invention, by applying an appropriate voltage to the first group of concentric electrodes and to the second group of concentric electrodes, problems arising from the difference in the effective aperture of the objective lens when the laser light used is changed and the difference in the peak position of the spherical aberration produced can be solved.

Moreover, in the liquid crystal optical element according to the present invention, the concentric electrodes belonging to the first group of concentric electrodes have widths causing a voltage distribution, between the concentric electrodes and the second electrode, that generates an aberration having a phase nearly opposite to that of an aberration that increases from the center of the liquid crystal cell halfway toward the periphery. According to the present invention, because a produced aberration that increases from the center of the liquid crystal cell halfway toward the periphery can be mostly offset, residual aberration can be reduced.

Further, in the liquid crystal optical element according to the present invention, the concentric electrodes belonging to the second group of concentric electrodes have widths causing a voltage distribution, between the concentric electrodes and the second electrode, that generates an aberration having a phase nearly opposite to that of an aberration that decreases from a midpoint, between the center of the liquid crystal cell and the periphery, to the periphery. According to the present invention, because a produced aberration that decreases from a midpoint, between the center of the liquid crystal cell and the periphery, to the periphery can be mostly offset, residual aberration can be reduced.

Further, in the liquid crystal optical element according to the present invention, the concentric electrodes belonging to the first group of concentric electrodes have widths causing a voltage distribution, between the concentric electrodes and the second electrode, that generates an aberration having a phase nearly opposite to that of an aberration that decreases from the center of the liquid crystal cell halfway toward the periphery. According to the present invention, because a produced aberration that decreases from the center of the liquid crystal cell halfway toward the periphery can be mostly offset, residual aberration can be reduced.

Furthermore, in the liquid crystal optical element according to the present invention, the concentric electrodes belonging to the second group of concentric electrodes have widths causing a voltage distribution, between the concentric electrodes and the second electrode, that generates an aberration having a phase nearly opposite to that of an aberration that increases from a midpoint, between the center of the liquid crystal cell and the periphery, to the periphery. According to the present invention, because a produced aberration that increases from a midpoint, between the center of the liquid crystal cell and the periphery, to the periphery can be mostly offset, residual aberration can be reduced.

Moreover, in the liquid crystal optical element according to the present invention, the power source unit supplies the extraction electrode connected to the independent concentric electrode with a voltage equal to the voltage supplied to one of the extraction electrodes connected to one of the groups of concentric electrodes. According to the present invention, by applying an appropriate voltage to the first group of concentric electrodes and to the second group of concentric electrodes, problems arising from the difference in the effective aperture of the objective lens when the laser light used is changed and the difference in the peak position of the spherical aberration produced can be solved.

Further, in the liquid crystal optical element according to the present invention, the power source unit, when correcting a spherical aberration of a disk with a small effective aperture of an objective lens, supplies the extraction electrode connected to the independent concentric electrode with a voltage between the voltage supplied to the extraction electrode connected to the concentric electrode, among the concentric electrodes belonging to the first group of concentric electrodes, that is located next to the independent concentric electrode and the voltage supplied to the extraction electrode connected to the concentric electrode, among the concentric electrodes belonging to the second group of concentric electrodes, that is located next to the independent concentric electrode. The present invention enables shifting the peak position of the correction aberration toward the center of the liquid crystal cell and therefore, enables correcting the spherical aberration of the disk for which the effective aperture of the objective lens is small.

Furthermore, in the liquid crystal optical element according to the present invention, a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, some of which are grouped to form a group of concentric electrodes, the second electrode is composed of a plurality of concentric electrodes concentrically arranged from a center of the second transparent substrate toward a periphery, some of which are grouped to form a group of concentric electrodes, the concentric electrodes that are adjacent among the concentric electrodes belonging to each group of concentric electrodes are connected through a resistor, and the concentric electrodes at each end of the concentric electrodes belonging to each group of concentric electrodes are connected to the power source unit through an extraction electrode.

The present invention, in case the group of concentric electrodes is provided on both of the first and second transparent substrates, enables generating the correction aberration against the produced aberration by applying appropriate voltages depending on the laser light used to the group of concentric electrodes and other concentric electrode not belonging thereto on the first transparent substrate and the group of concentric electrodes and other concentric electrode not belonging thereto on the second transparent substrate and therefore, enables reducing the residual aberration.

Moreover, in the liquid crystal optical element according to the present invention, an independent concentric electrode of a circular shape concentric with the concentric electrodes on the first transparent substrate is further provided on the first transparent substrate, independently without belonging to any group of concentric electrodes on the first transparent substrate, and the independent concentric electrode is connected to the power source unit through an extraction electrode. According to the present invention, by variation of the voltage applied to the independent concentric electrode, the peak position of the correction aberration can be matched to the produced aberration peak position which varies according to the laser light used.

Moreover, in the liquid crystal optical element according to the present invention, when the group of concentric electrodes arranged near the center of the liquid crystal cell on the second transparent substrate is designated as a first group of concentric electrodes and the group of concentric electrodes arranged near the periphery of the liquid crystal cell on the first transparent substrate is designated as a second group of concentric electrodes, the independent concentric electrode is provided between a concentric electrode on the first transparent substrate that opposes the first group of concentric electrodes and the second group of concentric electrodes. The present invention enables solving the difference in the effective aperture of the objective lens and the difference in the peak position of the produced aberration when the laser light used is changed from one type to another, by applying appropriate voltages to the first group of concentric electrodes, the concentric electrode opposing the first group of concentric electrodes, the independent concentric electrode, the second group of concentric electrodes, and the concentric electrode opposing the second group of concentric electrodes.

Moreover, in the liquid crystal optical element according to the present invention, the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that increases from the center of the liquid crystal cell halfway toward the periphery. According to the present invention, because a produced aberration that increases from the center of the liquid crystal cell halfway toward the periphery can be mostly offset, residual aberration can be reduced.

Moreover, in the liquid crystal optical element according to the present invention, the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that decreases from a midpoint, between the center of the liquid crystal cell and the periphery, to the periphery. According to the present invention, because a produced aberration that decreases from a midpoint, between the center of the liquid crystal cell and the periphery, to the periphery can be mostly offset, residual aberration can be reduced.

Moreover, in the liquid crystal optical element according to the present invention, the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that decreases from the center of the liquid crystal cell halfway toward the periphery. According to the present invention, because a produced aberration that decreases from the center of the liquid crystal cell halfway toward the periphery can be mostly offset, residual aberration can be reduced.

Furthermore, in the liquid crystal optical element according to the present invention, the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that increases from a midpoint, between the center of the liquid crystal cell and the periphery, to the periphery. According to the present invention, because a produced aberration that increases from a midpoint, between the center of the liquid crystal cell and the periphery, to the periphery can be mostly offset, residual aberration can be reduced.

Furthermore, in the liquid crystal optical element according to the present invention, the power source unit supplies the extraction electrode connected to the independent concentric electrode with a voltage equal to the voltage supplied to one of the extraction electrodes connected to the second group of concentric electrodes. The present invention enables solving the difference in the effective aperture of the objective lens and the difference in the peak position of the produced aberration when the laser light used is changed from one type to another, by applying appropriate voltages to the first group of concentric electrodes, the concentric electrode opposing the first group of concentric electrodes, the second group of concentric electrodes, and the concentric electrode opposing the second group of concentric electrodes.

Moreover, in the liquid crystal optical element according to the present invention, the power source unit, when correcting a spherical aberration of a disk with a small effective aperture of an objective lens, supplies the extraction electrode connected to the independent concentric electrode with a voltage between the voltage supplied to the extraction electrode connected to the concentric electrode among the concentric electrodes belonging to the first group of concentric electrodes that is located close to the independent concentric electrode and the voltage supplied to the extraction electrode connected to the concentric electrode among the concentric electrodes belonging to the second group of concentric electrodes that is located next to the independent concentric electrode. The present invention enables shifting the peak position of the correction aberration toward the center of the liquid crystal cell and therefore, enables correcting the spherical aberration of the disk for which the effective aperture of the objective lens is small.

Further, in the liquid crystal optical element according to the present invention, a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate and the plurality of concentric electrodes composing the first electrode are grouped into at least two groups of concentric electrodes, the second electrode is composed of a plurality of concentric electrodes concentrically arranged from the center of the second transparent substrate toward the periphery and the plurality of concentric electrodes composing the second electrode are grouped into at least two groups of concentric electrodes, among the concentric electrodes belonging to each group of concentric electrodes, the concentric electrodes that are adjacent to each other are connected through a resistor, and the concentric electrodes at each end of the concentric electrodes belonging to each group of concentric electrodes are connected to the power source unit through an extraction electrode.

The present invention, in case the group of concentric electrodes is provided on both of the first and second transparent substrates, enables generating the correction aberration against the produced aberration by applying appropriate voltages depending on the laser light used to the group of concentric electrodes on the first transparent substrate and the group of concentric electrodes on the second transparent substrate and therefore, enables reducing the residual aberration.

Furthermore, in the liquid crystal optical element according to the present invention, an independent concentric electrode of a circular shape concentric with the concentric electrodes on the first transparent substrate is further provided on the first transparent substrate, independently without belonging to any group of concentric electrodes on the first transparent substrate, and the independent concentric electrode is connected to the power source unit through an extraction electrode. According to the present invention, by variation of the voltage applied to the independent concentric electrode, the peak position of the correction aberration can be matched to the produced aberration peak position which varies according to the laser light used.

Further, in the liquid crystal optical element according to the present invention, when among the plurality of groups of concentric electrodes provided on the first transparent substrate, the group of concentric electrodes arranged near the center of the liquid crystal cell is designated as a first group of concentric electrodes and the group of concentric electrodes arranged near the periphery of the liquid crystal cell is designated as a second group of concentric electrodes, and among the plurality of groups of concentric electrodes provided on the second transparent substrate, the group of concentric electrodes arranged near the center of the liquid crystal cell is designated as a third group of concentric electrodes and the group of concentric electrodes arranged near the periphery of the liquid crystal cell is designated as a fourth group of concentric electrodes, the independent concentric electrode is provided between the first group of concentric electrodes and the second group of concentric electrodes. The present invention enables solving the difference in the effective aperture of the objective lens and the difference in the peak position of the produced aberration when the laser light used is changed from one type to another, by applying appropriate voltages to the first group of concentric electrodes, the second group of concentric electrodes, the independent concentric electrode, the third group of concentric electrodes, and the fourth group of concentric electrodes.

Moreover, in the liquid crystal optical element according to the present invention, the concentric electrodes belonging to the third group of concentric electrodes have widths causing a voltage distribution, between the concentric electrodes and the first group of concentric electrodes, that generates an aberration having a phase nearly opposite to that of an aberration that increases from the center of the liquid crystal cell halfway toward the periphery. According to the present invention, because a produced aberration that increases from the center of the liquid crystal cell halfway toward the periphery can be mostly offset, residual aberration can be reduced.

Furthermore, in the liquid crystal optical element according to the present invention, the concentric electrodes belonging to the second group of concentric electrodes have widths causing a voltage distribution, between the concentric electrodes and the fourth group of concentric electrodes, that generates an aberration having a phase nearly opposite to that of an aberration that decreases from a midpoint, between the center of the liquid crystal cell and the periphery, to the periphery. According to the present invention, because a produced aberration that decreases from a midpoint, between the center of the liquid crystal cell and the periphery, to the periphery can be mostly offset, residual aberration can be reduced.

Moreover, in the liquid crystal optical element according to the present invention, the concentric electrodes belonging to the third group of concentric electrodes have widths causing a voltage distribution, between the concentric electrodes and the first group of concentric electrodes, that generates an aberration having a phase nearly opposite to that of an aberration that decreases from the center of the liquid crystal cell halfway toward the periphery. According to the present invention, because a produced aberration that decreases from the center of the liquid crystal cell halfway toward the periphery can be mostly offset, residual aberration can be reduced.

Furthermore, in the liquid crystal optical element according to the present invention, the concentric electrodes belonging to the second group of concentric electrodes have widths causing a voltage distribution, between the concentric electrodes and the fourth group of concentric electrodes, that generates an aberration having a phase nearly opposite to that of an aberration that increases from a midpoint, between the center of the liquid crystal cell and the periphery, to the periphery. According to the present invention, because a produced aberration that increases from a midpoint, between the center of the liquid crystal cell and the periphery, to the periphery can be mostly offset, residual aberration can be reduced.

Further, in the liquid crystal optical element according to the present invention, the power source unit supplies the extraction electrode connected to the independent concentric electrode with a voltage equal to the voltage supplied to one of the extraction electrodes connected to one of the groups of concentric electrodes provided on the first transparent substrate. The present invention enables solving the difference in the effective aperture of the objective lens and the difference in the peak position of the produced aberration when the laser light used is changed from one type to another, by applying appropriate voltages to the first group of concentric electrodes, the second group of concentric electrodes, the third group of concentric electrodes, and the fourth group of concentric electrodes.

Additionally, in the liquid crystal optical element according to the present invention, the power source unit, when correcting a spherical aberration of a disk with a small effective aperture of an objective lens, supplies the extraction electrode connected to the independent concentric electrode with a voltage between the voltage supplied to the extraction electrode connected to the concentric electrode among the concentric electrodes belonging to the third group of concentric electrodes that is located close to the independent concentric electrode and the voltage supplied to the extraction electrode connected to the concentric electrode among the concentric electrodes belonging to the second group of concentric electrodes that is located next to the independent concentric electrode. The present invention enables shifting the peak position of the correction aberration toward the center of the liquid crystal cell and therefore, enables correcting the spherical aberration of the disk for which the effective aperture of the objective lens is small.

Moreover, in the liquid crystal optical element according to the present invention, the power source unit, when correcting a spherical aberration of a disk with a large effective aperture of an objective lens, supplies the extraction electrode connected to the independent concentric electrode with a voltage equal to the voltage supplied to the extraction electrode connected to the concentric electrode among the concentric electrodes belonging to the second group of concentric electrodes that is located next to the independent concentric electrode. The present invention enables shifting the peak position of the correction aberration toward the periphery of the liquid crystal cell and therefore, enables correcting the spherical aberration of the disk for which the effective aperture of the objective lens is large.

To solve the above problems and achieve an objective, a liquid crystal optical element according to the present invention, includes a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, a first correction unit that corrects spherical aberration of a disk with a large effective aperture of an objective lens is composed of all of the plurality of concentric electrodes, and a second correction unit that corrects the spherical aberration of the disk with a small effective aperture of the objective lens is composed of, among the plurality of concentric electrodes, the concentric electrodes arranged from the center of the first transparent substrate halfway toward the periphery.

Further, a liquid crystal optical element according to the present invention, includes a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate and the plurality of concentric electrodes making up the first electrode are divided into groups of concentric electrodes, at least two, the concentric electrodes that are adjacent among the concentric electrodes belonging to each group of concentric electrodes are connected through a resistor, a first correction unit that corrects spherical aberration of a disk with a large effective aperture of an objective lens is composed of all of the groups of concentric electrodes, and wherein a second correction unit that corrects the spherical aberration of the disk with a small effective aperture of the objective lens is composed of, among the groups of concentric electrodes, the group of concentric electrodes arranged from the center of the first transparent substrate halfway toward the periphery.

According to the present invention, generation of an aberration having a phase nearly opposite (hereinafter, correction aberration) to that of the aberration produced without correction being made by the liquid crystal optical element (hereinafter, simply, produced aberration), is enabled by applying appropriate voltages, according to the laser light used for a disk with a large effective aperture of the objective lens, to the concentric electrodes making up the first correction unit of the first electrode. The present invention enables generation of the correction aberration against the produced aberration by applying appropriate voltages, according to the laser light used for a disk with a small effective aperture of the objective lens, to the concentric electrodes making up the second correction unit out of the first electrode. Therefore, reduction of the aberration after correction by the liquid crystal optical element (hereinafter, residual aberration) with respect to both the laser light for the disk with the large effective aperture of the objective lens and the laser light for the disk with the small effective aperture of the objective lens is enabled.

Additionally, in the liquid crystal optical element according to the present invention, an independent concentric electrode of a circular shape concentric with the concentric electrodes is further provided on the first transparent substrate, independently without belonging to any group of concentric electrodes. According to the present invention, by variation of the voltage applied to the independent concentric electrode, the peak position of the correction aberration can be matched to the produced aberration peak position which varies according to the laser light used.

Moreover, in the liquid crystal optical element according to the present invention, the independent concentric electrode is provided between one of the groups of concentric electrodes and another one of the groups of concentric electrodes. The present invention enables solving the difference in the effective aperture of the objective lens and the difference in the peak position of the produced aberration when the laser light used is changed from one type to another, by applying appropriate voltages to the independent concentric electrode and two groups of concentric electrodes sandwiching the independent concentric electrode.

Further, in the liquid crystal optical element according to the present invention, the first correction unit is composed of a first group of concentric electrodes near the center of the liquid crystal cell and a second group of concentric electrodes near the periphery of the liquid crystal cell, and the second correction unit is composed of the first group of concentric electrodes. The present invention enables generating the correction aberration against the produced aberration by applying appropriate voltages according to the laser light for the disk with the large effective aperture of the objective lens to the concentric electrodes belonging to the first group of concentric electrodes and the concentric electrodes belonging to the second group of concentric electrodes. The present invention enables generating the correction aberration against the produced aberration by applying appropriate voltages according to the laser light for the disk with the small effective aperture of the objective lens to the concentric electrodes belonging to the first group of concentric electrodes. Therefore, the present invention enables reducing the residual aberration with respect to both of the laser light for the disk with the large effective aperture of the objective lens and the laser light for the disk with the small effective aperture of the objective lens.

Additionally, in the liquid crystal optical element according to the present invention, the concentric electrodes belonging to the first group of concentric electrodes have widths causing a voltage distribution, between the concentric electrodes and the second electrode, that generates an aberration having a phase nearly opposite to that of an aberration that increases from the center of the liquid crystal cell halfway toward the periphery. According to the present invention, because a produced aberration that increases from the center of the liquid crystal cell halfway toward the periphery can be mostly offset, residual aberration can be reduced.

Moreover, in the liquid crystal optical element according to the present invention, the concentric electrodes belonging to the second group of concentric electrodes have widths causing a voltage distribution, between the concentric electrodes and the second electrode, that generates an aberration having a phase nearly opposite to that of an aberration that decreases from a midpoint, between the center of the liquid crystal cell and the periphery, to the periphery. According to the present invention, because a produced aberration that decreases from a midpoint, between the center of the liquid crystal cell and the periphery, to the periphery can be mostly offset, residual aberration can be reduced.

Furthermore, in the liquid crystal optical element according to the present invention, the concentric electrodes belonging to the first group of concentric electrodes have widths causing a voltage distribution, between the concentric electrodes and the second electrode, that generates an aberration having a phase nearly opposite to that of an aberration that decreases from the center of the liquid crystal cell halfway toward the periphery. According to the present invention, because a produced aberration that decreases from the center of the liquid crystal cell halfway toward the periphery can be mostly offset, residual aberration can be reduced.

In addition, in the liquid crystal optical element according to the present invention, the concentric electrodes belonging to the second group of concentric electrodes have widths causing a voltage distribution, between the concentric electrodes and the second electrode, that generates an aberration having a phase nearly opposite to that of an aberration that increases from a midpoint, between the center of the liquid crystal cell and the periphery, to the periphery. According to the present invention, because a produced aberration that increases from a midpoint, between the center of the liquid crystal cell and the periphery, to the periphery can be mostly offset, residual aberration can be reduced.

Moreover, in the liquid crystal optical element according to the present invention, the power source unit, when correcting a spherical aberration of a disk with a small effective aperture of an objective lens, supplies the independent concentric electrode with a voltage between the voltage supplied to the concentric electrode among the concentric electrodes belonging to the first group of concentric electrodes that is located next to the independent concentric electrode and the voltage supplied to the concentric electrode among the concentric electrodes belonging to the second group of concentric electrodes that is located next to the independent concentric electrode. The present invention enables shifting the peak position of the correction aberration toward the center of the liquid crystal cell and therefore, enables correcting the spherical aberration of the disk for which the effective aperture of the objective lens is small.

Also, a liquid crystal optical element according to the present invention, includes a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, the second electrode is composed of a plurality of concentric electrodes concentrically arranged from a center of the second transparent substrate toward a periphery of the second transparent substrate, a first correction unit that corrects spherical aberration of a disk with a large effective aperture of an objective lens is composed of all of the concentric electrodes arranged on the first transparent substrate and all of the concentric electrodes arranged on the second transparent substrate, and a second correction unit that corrects the spherical aberration of the disk with a small effective aperture of the objective lens is composed of, among the plurality of concentric electrodes arranged on the first transparent substrate, the concentric electrodes arranged from the center halfway toward the periphery and, among the plurality of concentric electrodes arranged on the second transparent substrate, the concentric electrodes arranged from the center halfway toward the periphery.

According to the present invention, generation of the correction aberration against the produced aberration is enabled by applying appropriate voltages according to the laser light for the disk with the large effective aperture of the objective lens to the concentric electrode of a first correction unit formed by either first or a second electrode. The present invention enables generating the correction aberration against the produced aberration by applying appropriate voltages according to the laser light for the disk with the small effective aperture of the objective lens to the concentric electrode of a second correction unit formed by either the first or the second electrode. Therefore, the present invention enables reducing the residual aberration with respect to both of the laser light for the disk with the large effective aperture of the objective lens and the laser light for the disk with the small effective aperture of the objective lens.

Moreover, a liquid crystal optical element according to the present invention, includes a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, some of which are grouped to form a group of concentric electrodes, the second electrode is composed of a plurality of concentric electrodes concentrically arranged from a center of the second transparent substrate toward a periphery, some of which are grouped to form a group of concentric electrodes, the concentric electrodes that are adjacent among the concentric electrodes belonging to each group of concentric electrodes are connected through a resistor, a first correction unit that corrects spherical aberration of a disk with a large effective aperture of an objective lens is composed of all of the groups of concentric electrodes, and wherein a second correction unit that corrects the spherical aberration of the disk with a small effective aperture of the objective lens is composed of the group of concentric electrodes arranged from the center of the liquid crystal cell halfway toward the periphery.

The present invention, in case a group of concentric electrodes is provided on both of the first transparent substrate and the second transparent substrate, enables generating the correction aberration against the produced aberration by applying appropriate voltages according to the laser light used to the group of concentric electrodes and other concentric electrodes not belonging thereto on the first transparent substrate and the group of concentric electrodes and other concentric electrodes not belonging thereto on the second transparent substrate and therefore, enables reducing the residual aberration.

Further, in the liquid crystal optical element according to the present invention, an independent concentric electrode of a circular shape concentric with the concentric electrodes on the first transparent substrate is further provided on the first transparent substrate, independently without belonging to any group of concentric electrodes on the first transparent substrate. According to the present invention, by variation of the voltage applied to the independent concentric electrode, the peak position of the correction aberration can be matched to the produced aberration peak position which varies according to the laser light used.

Additionally, in the liquid crystal optical element according to the present invention, when the group of concentric electrodes arranged near the center of the liquid crystal cell on the second transparent substrate is designated as a first group of concentric electrodes and the group of concentric electrodes arranged near the periphery of the liquid crystal cell on the first transparent substrate is designated as a second group of concentric electrodes, the independent concentric electrode is provided between a concentric electrode on the first transparent substrate that opposes the first group of concentric electrodes and the second group of concentric electrodes. The present invention enables solving the difference in the effective aperture of the objective lens and the difference in the peak position of the produced aberration when the laser light used is changed from one type to another, by applying appropriate voltages to the first group of concentric electrodes, the concentric electrode opposing the first group of concentric electrodes, the independent concentric electrode, the second group of concentric electrodes, and the concentric electrode opposing the second group of concentric electrodes.

Moreover, in the liquid crystal optical element according to the present invention, the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that increases from the center of the liquid crystal cell halfway toward the periphery. According to the present invention, because a produced aberration that increases from the center of the liquid crystal cell halfway toward the periphery can be mostly offset, residual aberration can be reduced.

Furthermore, in the liquid crystal optical element according to the present invention, the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that decreases from a midpoint, between the center of the liquid crystal cell and the periphery, to the periphery. According to the present invention, because a produced aberration that decreases from a midpoint, between the center of the liquid crystal cell and the periphery, to the periphery can be mostly offset, residual aberration can be reduced.

Also, in the liquid crystal optical element according to the present invention, the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that decreases from the center of the liquid crystal cell halfway toward the periphery. According to the present invention, because a produced aberration that decreases from the center of the liquid crystal cell halfway toward the periphery can be mostly offset, residual aberration can be reduced.

Moreover, in the liquid crystal optical element according to the present invention, the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that increases from a midpoint, between the center of the liquid crystal cell and the periphery, to the periphery. According to the present invention, because a produced aberration that increases from a midpoint, between the center of the liquid crystal cell and the periphery, to the periphery can be mostly offset, residual aberration can be reduced.

In addition, in the liquid crystal optical element according to the present invention, the power source unit, when correcting a spherical aberration of a disk with a small effective aperture of an objective lens, supplies the independent concentric electrode with a voltage between the voltage supplied to the concentric electrode among the concentric electrodes belonging to the first group of concentric electrodes that is located close to the independent concentric electrode and the voltage supplied to the concentric electrode among the concentric electrodes belonging to the second group of concentric electrodes that is located next to the independent concentric electrode. The present invention enables shifting the peak position of the correction aberration toward the center of the liquid crystal cell and therefore, enables correcting the spherical aberration of the disk for which the effective aperture of the objective lens is small.

Further, a liquid crystal optical element according to the present invention, includes a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate and the plurality of concentric electrodes making up the first electrode are divided into at least two groups of concentric electrodes, wherein the second electrode is composed of a plurality of concentric electrodes concentrically arranged from the center of the second transparent substrate toward the periphery and the plurality of concentric electrodes making up the second electrode are divided into at least two groups of concentric electrodes, the concentric electrodes that are adjacent among the concentric electrodes belonging to each group of concentric electrodes are connected through a resistor, a first correction unit that corrects spherical aberration of a disk with a large effective aperture of an objective lens is composed of all of the groups of concentric electrodes, and wherein a second correction unit that corrects the spherical aberration of the disk with a small effective aperture of the objective lens is composed of the group of concentric electrodes arranged from the center of the liquid crystal cell halfway toward the periphery.

According to the present invention, in the case when a first transparent substrate and a second transparent substrate are both provided with groups of concentric electrodes, generation of a compensation aberration against a produced aberration is enabled by applying appropriate voltages, according to the laser light used for a disk with a large effective aperture of the objective lens, to the concentric electrodes making up the first correction unit of the first electrode. The present invention enables generation of the correction aberration against the produced aberration by applying appropriate voltages, according to the laser light used for a disk with a small effective aperture of the objective lens, to the concentric electrodes making up the second correction unit. Therefore, reduction of the aberration after correction by the liquid crystal optical element (hereinafter, residual aberration) with respect to both the laser light for the disk with the large effective aperture of the objective lens and the laser light for the disk with the small effective aperture of the objective lens is enabled.

Moreover, in the liquid crystal optical element according to the present invention, an independent concentric electrode of a circular shape concentric with the concentric electrodes on the first transparent substrate is further provided on the first transparent substrate, independently without belonging to any group of concentric electrodes on the first transparent substrate. According to the present invention, by variation of the voltage applied to the independent concentric electrode, the peak position of the correction aberration can be matched to the produced aberration peak position which varies according to the laser light used.

Furthermore, in the liquid crystal optical element according to the present invention, the independent concentric electrode is provided between two of the groups of concentric electrodes arranged on the first transparent substrate. The present invention enables solving the difference in the effective aperture of the objective lens and the difference in the peak position of the produced aberration when the laser light used is changed from one type to another, by applying appropriate voltages to the independent concentric electrode and two groups of concentric electrodes sandwiching the independent concentric electrode.

In addition, in the liquid crystal optical element according to the present invention, when among the plurality of groups of concentric electrodes provided on the first transparent substrate, the group of concentric electrodes arranged near the center of the liquid crystal cell is designated as a first group of concentric electrodes and the group of concentric electrodes arranged near the periphery of the liquid crystal cell is designated as a second group of concentric electrodes, and among the plurality of groups of concentric electrodes provided on the second transparent substrate, the group of concentric electrodes arranged near the center of the liquid crystal cell is designated as a third group of concentric electrodes and the group of concentric electrodes arranged near the periphery of the liquid crystal cell is designated as a fourth group of concentric electrodes, the first correction unit is composed of the first group of concentric electrodes, the second group of concentric electrodes, the third group of concentric electrodes, and the fourth group of concentric electrodes, and the second correction unit is composed of the first group of concentric electrodes and the third group of concentric electrodes. According to the present invention, generation of a correction aberration against a produced aberration is enabled by applying appropriate voltages, according to the laser light used for a disk with a large effective aperture of the objective lens, to the first group of concentric electrodes, the second group of concentric electrodes, the third group of concentric electrodes and to each of the concentric electrodes of the second group of concentric electrodes. The present invention enables generation of the correction aberration against the produced aberration by applying appropriate voltages, according to the laser light used for a disk with a small effective aperture of the objective lens, to each of the concentric electrodes the first group of concentric electrodes and of the second group of concentric electrodes. Therefore, reduction of the aberration after correction with respect to both the laser light for the disk with the large effective aperture of the objective lens and the laser light for the disk with the small effective aperture of the objective lens is enabled.

Moreover, in the liquid crystal optical element according to the present invention, the concentric electrodes belonging to the third group of concentric electrodes have widths causing a voltage distribution, between the concentric electrodes and the first group of concentric electrodes, that generates an aberration having a phase nearly opposite to that of an aberration that increases from the center of the liquid crystal cell halfway toward the periphery. According to the present invention, because a produced aberration that increases from the center of the liquid crystal cell halfway toward the periphery can be mostly offset, residual aberration can be reduced.

Further, in the liquid crystal optical element according to the present invention, the concentric electrodes belonging to the second group of concentric electrodes have widths causing a voltage distribution, between the concentric electrodes and the fourth group of concentric electrodes, that generates an aberration having a phase nearly opposite to that of an aberration that decreases from a midpoint, between the center of the liquid crystal cell and the periphery, to the periphery. According to the present invention, because a produced aberration that decreases from a midpoint, between the center of the liquid crystal cell and the periphery, to the periphery can be mostly offset, residual aberration can be reduced.

Additionally, in the liquid crystal optical element according to the present invention, the concentric electrodes belonging to the third group of concentric electrodes have widths causing a voltage distribution, between the concentric electrodes and the first group of concentric electrodes, that generates an aberration having a phase nearly opposite to that of an aberration that decreases from the center of the liquid crystal cell halfway toward the periphery. According to the present invention, because a produced aberration that decreases from the center of the liquid crystal cell halfway toward the periphery can be mostly offset, residual aberration can be reduced.

Moreover, in the liquid crystal optical element according to the present invention, the concentric electrodes belonging to the second group of concentric electrodes have widths causing a voltage distribution, between the concentric electrodes and the fourth group of concentric electrodes, that generates an aberration having a phase nearly opposite to that of an aberration that increases from a midpoint, between the center of the liquid crystal cell and the periphery, to the periphery. According to the present invention, because a produced aberration that increases from a midpoint, between the center of the liquid crystal cell and the periphery, to the periphery can be mostly offset, residual aberration can be reduced.

Furthermore, in the liquid crystal optical element according to the present invention, the power source unit, when correcting a spherical aberration of a disk with a small effective aperture of an objective lens, supplies the independent concentric electrode with a voltage between the voltage supplied to the concentric electrode among the concentric electrodes belonging to the third group of concentric electrodes that is located close to the independent concentric electrode and the voltage supplied to the concentric electrode among the concentric electrodes belonging to the second group of concentric electrodes that is located next to the independent concentric electrode. The present invention enables shifting the peak position of the correction aberration toward the center of the liquid crystal cell and therefore, enables correcting the spherical aberration of the disk for which the effective aperture of the objective lens is small.

Also, in the liquid crystal optical element according to the present invention, the power source unit, when correcting a spherical aberration of a disk with a large effective aperture of an objective lens, supplies the independent concentric electrode with a voltage equal to the voltage supplied to the concentric electrode among the concentric electrodes belonging to the second group of concentric electrodes that is located next to the independent concentric electrode. The present invention enables shifting the peak position of the correction aberration toward the periphery of the liquid crystal cell and therefore, enables correcting the spherical aberration of the disk for which the effective aperture of the objective lens is large.

Further, in the liquid crystal optical element according to the present invention, resistance values of the resistors connecting every two concentric electrodes belonging to one group of concentric electrodes are the same. According to the present invention, electrodes can be easily manufactured on a surface of the transparent substrate. Furthermore, in the liquid crystal optical element according to the present invention, resistance values of the resistors connecting every two concentric electrodes belonging to each group of concentric electrodes are the same. According to the present invention, electrodes can be further easily manufactured on a surface of the transparent substrate.

EFFECT OF THE INVENTION

The liquid crystal optical element according to the present invention has an effect of solving the difference in the effective aperture of the objective lens in the case of using various types of laser lights such as the blue laser light, the red laser light, and the infrared laser light. The liquid crystal optical element according to the present invention has another effect of solving the difference in the peak position of the spherical aberration produced in the case of using various types of laser lights such as the blue laser light, the red laser light, and the infrared laser light.

Figure 1:
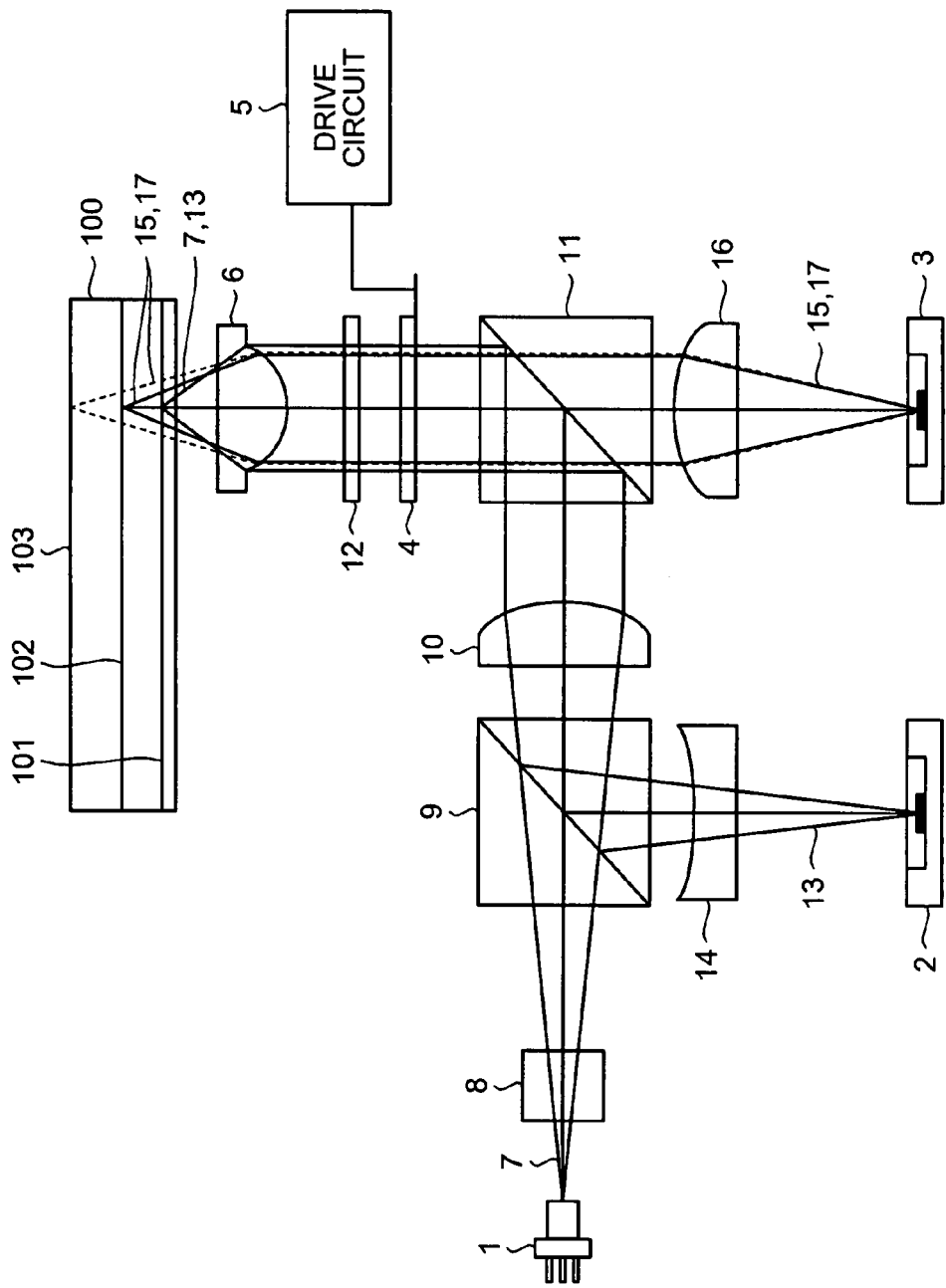
FIG. 1 is a diagram of a schematic configuration of an optical head device to which a liquid crystal optical element according to the present invention is applied.

EXPLANATIONS OF LETTERS OR NUMERALS 4 liquid crystal cell
5 power source unit (drive circuit)
21, 121 first electrode
22 first transparent substrate
23, 123 second electrode
24 second transparent substrate
26 liquid crystal layer
31 to 43, 71, 73 concentric electrode
36 independent concentric electrode
44, 75 first group of concentric electrodes
45, 76 second group of concentric electrodes

BEST MODE(S) FOR CARRYING OUT THE INVENTION

Detailed description is made of exemplary embodiments of a liquid crystal optical element according to the present invention with reference to accompanying drawings. Here, though not particularly limited hereto, description is made of an example in which the liquid crystal optical element according to the present invention is applied as a liquid crystal wave front control element that corrects a fluctuation, a distortion, an aberration, etc., of the wave front. In the following description, a DVD of approximately 5 gigabyte recording capacity is referred to as a conventional DVD and a DVD of a higher recording density than that of the conventional DVD is referred to as a high density DVD, thereby distinguishing the two DVDs from each other.

First Embodiment

FIG. 1 is a diagram of a schematic configuration of an optical head device to which a liquid crystal optical element according to the present invention is applied. As shown in FIG. 1, the optical head device comprises a blue laser light source 1 that projects the blue laser light of a wavelength on the order of 400 nm, a blue-color-use photodiode 2 that detects a return light of the laser light projected from the blue laser light source 1, a DVD/CD-use module 3 that integrates a laser light source that projects a infrared laser light of a wavelength on the order of 780 nm and a red laser light of a wavelength on the order of 660 nm and a photodiode that detects respective return lights of these two laser lights, a liquid crystal cell 4 that makes up a major part of the liquid crystal optical element that performs a wave front control such as a spherical aberration correction, a drive circuit 5 that constitutes a power source unit of the liquid crystal optical element, and an objective lens 6.

A blue laser light 7 projected from the blue laser light source 1 passes through a beam forming device 8, a polarized beam splitter 9, a movable collimator 10, a dichroic mirror 11, a liquid crystal cell 4, a wide-band wavelength plate 12, and an objective lens and is condensed on a data recording layer of an optical disk 100. The optical disk 100 in this case is the high density DVD and has the data recording layer at the depth of, for example, 0.1 mm from the surface on the side of the disk on which the laser light is irradiated. The return light 13 of the blue laser light reflected by the data recording layer 101 passes through the objective lens 6, the wide-band wavelength plate 12, the liquid crystal cell 4, the dichroic mirror 11, the movable collimator 10, the polarized beam splitter 9, and a lens 14 and is condensed on the blue-color-use photodiode 2.

On the other hand, the red laser light (or the infrared laser light) 15 projected from the DVD/CD-use module 3 passes through a lens 16, the dichroic mirror 11, the liquid crystal cell 4, the wide-band wavelength plate 12, and the objective lens and is condensed on the data recording layer of the optical disk 100. The optical disk 100 in this case is the conventional DVD in the case of the red laser light and is the CD in the case of the infrared laser light. The data recording layer 102 of the conventional DVD and the data recording layer 103 of the CD are provided at the depth of, for example, 0.6 mm and 1.2 mm from the surface on the side of the disk on which the laser light is irradiated.

The return light 17 of the red laser light (or the infrared laser light) reflected by the data recording layer 102 (or the data recording layer 103) passes through the objective lens 6, the wide-band wavelength plate 12, the liquid crystal cell 4, the dichroic mirror 11, and the lens 16 and is condensed on the DVD/CD-use module 3. Here, the optical head device according to the present embodiments is designed so that the produced aberration is minimized in case the infrared laser light is irradiated on the CD in a configuration with the liquid crystal cell 4 and the drive circuit 5 excluded. Therefore, while no correction of the spherical aberration is required in the case of irradiating the infrared laser light on the CD, the correction of the spherical aberration by the liquid crystal cell 4 and the drive circuit 5 is required in the case of irradiating the blue laser light on the high density DVD and the red laser light on the conventional DVD.

Figure 2:
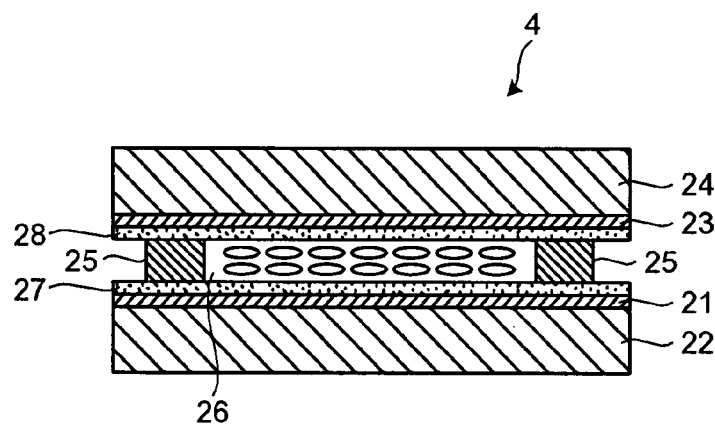
FIG. 2 is a diagram of an example of a cross-sectional configuration of the liquid crystal optical element according to the present invention.

FIG. 2 is a diagram of a cross-sectional configuration of the liquid crystal cell 4. As shown in FIG. 2, the liquid crystal cell 4 is configured to encapsulate a liquid crystal layer 26 by a first transparent substrate 22 having a first electrode 21 on its surface, a second transparent substrate 24 having a second electrode 23 on its surface, and a sealant 25. Orientation films 27 and 28 are provided between the first electrode 21 and the liquid crystal layer 26 and between the second electrode 23 and the liquid crystal layer 26, respectively. The first electrode 21 and the second electrode 23 are supplied with a voltage from the drive circuit 5 (see FIG. 1) so that a desired voltage (AC voltage) can be applied to the liquid crystal layer 26 sandwiched in between. While the first electrode 21 and the second electrode 23 are formed in respective patterns to be described later, the liquid crystal cell 4 is manufactured by the same manufacturing process as used for general liquid crystal display panels. However, a plurality of liquid crystal cells 4 are simultaneously formed on the substrate and thereafter, are cut into individual liquid crystal cells 4.

Figure 3:
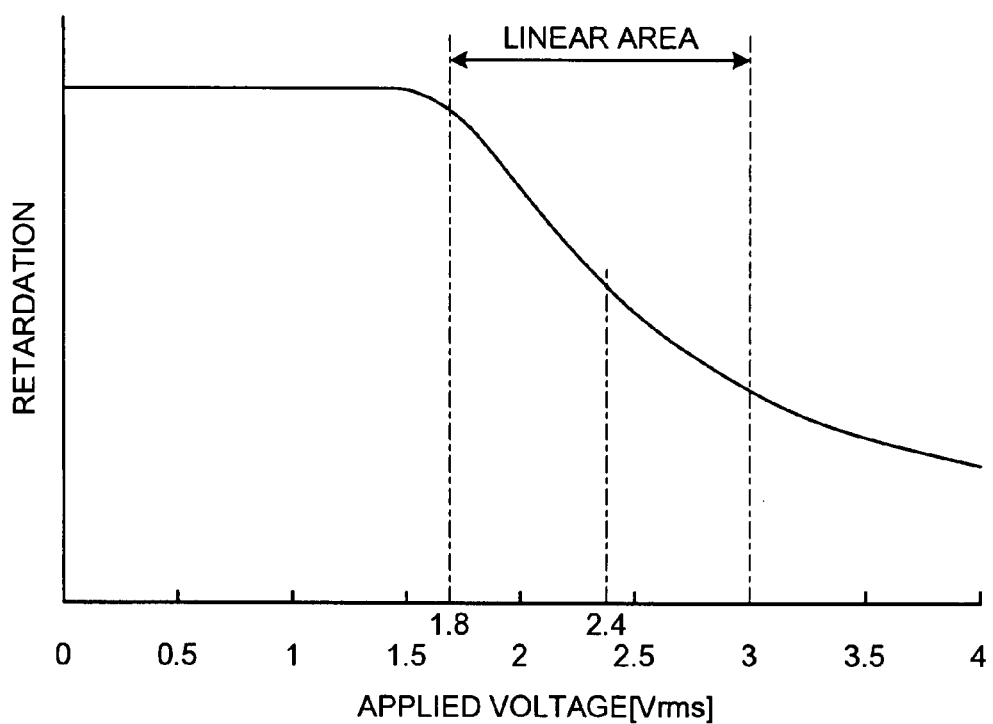
FIG. 3 is a diagram of relationship between retardation and applied voltage of liquid crystal.

FIG. 3 is a diagram of an example of relationship between retardation and applied voltage of the liquid crystal. In the present embodiments, the spherical aberration is corrected using the voltage range in which the retardation changes approximately linearly relative to the voltage applied to the liquid crystal layer (voltage difference between the first and second electrodes), as shown in FIG. 3. The characteristics shown in FIG. 3 are those of the liquid crystal cell with homogeneous orientation of the liquid crystal layer, a cell gap of 10 μm, and the refractive index of 1.5 to 1.7. Though not particularly limited hereto, in the case of the example shown in FIG. 3, to correct the spherical aberration, the liquid crystal layer is driven with a reference voltage at 2.4 Vrms and the voltage range of 1.8 to 3.0 Vrms.

Figure 4:
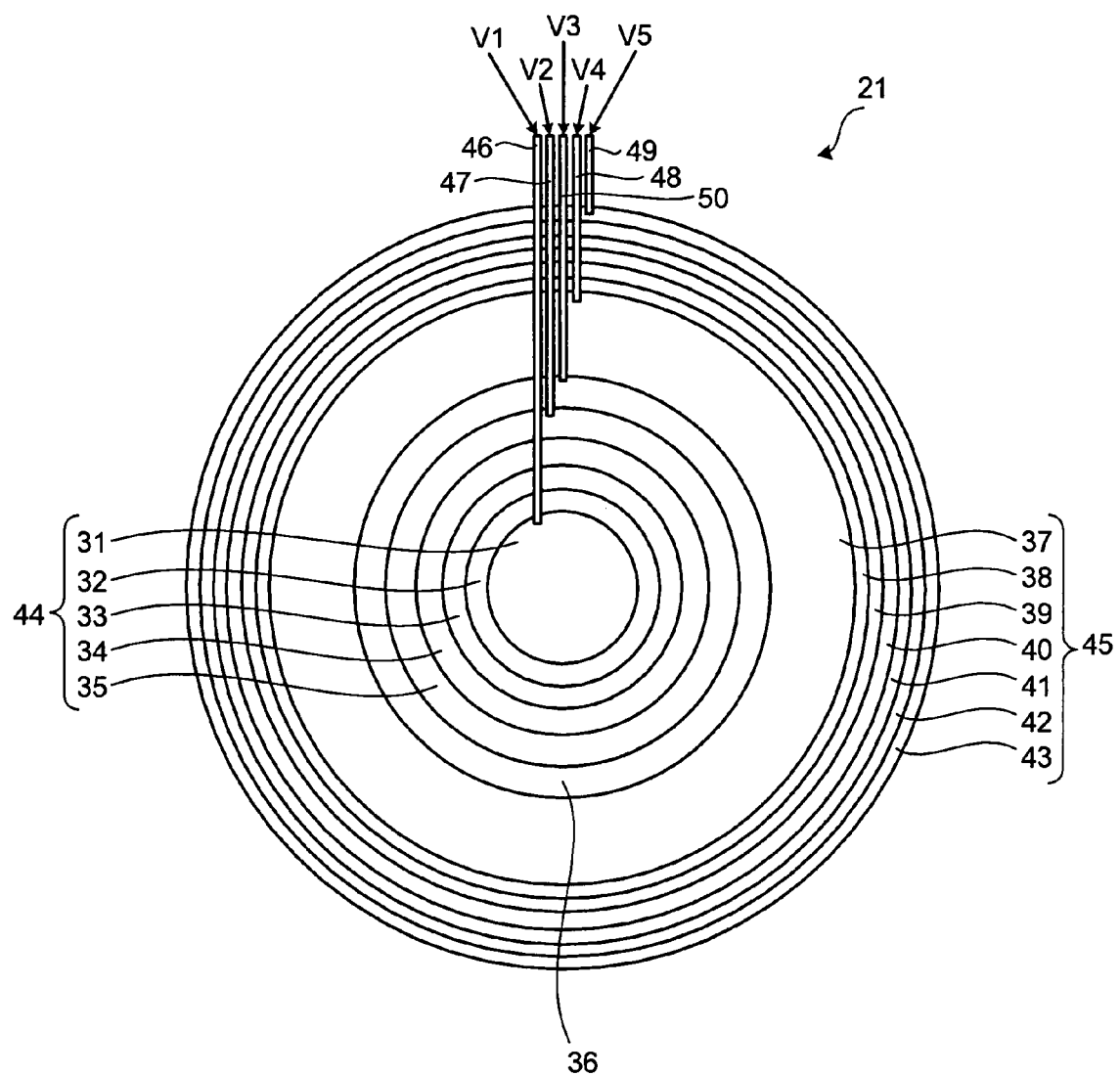
FIG. 4 is a diagram of a first electrode of the liquid crystal optical element according to a first embodiment of the present invention.

FIG. 4 is a diagram of a pattern of the first electrode 21. As shown in FIG. 4, the first electrode is composed of, for example, 13 low-resistance concentric electrodes 31 to 43, centered at an optical axis (not shown) of light flux passing through the liquid crystal cell 4 and arranged concentrically from the center toward the periphery of the first transparent substrate 22. A space of, for example, 3 μm is provided between each two adjacent concentric electrodes of the concentric electrodes 31 to 43 so as to insulate each two adjacent concentric electrodes from each other. This space is omitted in FIG. 4. The innermost electrode (hereinafter, 1st concentric electrode) 31 is formed in a round shape. Each of other concentric electrodes 32 to 43 is formed in a ring shape. These concentric electrodes 32 to 43, sequentially from the inner side toward the outer side, are hereinafter referred to as a 2nd concentric electrode 32, a 3rd concentric electrode 33, . . . , and, a 13th concentric electrode 43.

Though not particularly limited hereto, for example, the 1st to the 5th concentric electrodes 31 to 35 make up a first group of concentric electrodes 44. The first group of concentric electrodes 44 constitutes a second correction unit. The 1st concentric electrode 31 and the 2nd concentric electrode 32, the 2nd concentric electrode 32 and the 3rd concentric electrode 33, the 3rd concentric electrode 33 and the 4th concentric electrode 34, and the 4th concentric electrode 34 and the 5th concentric electrode 35 are respectively connected through resistors not shown (see FIG. 6) of the same resistance value (referred to as R1). The 1st concentric electrode 31 and the 5th concentric electrode 35, positioned at both ends of the first group of concentric electrodes, are connected to a first extraction electrode 46 and a second extraction electrode 47, respectively.

For example, the 7th to 13th concentric electrodes 37 to 43 constitute a second group of concentric electrodes 45. The second group of concentric electrodes 45 coupled with the first group of concentric electrodes 44 constitutes a first correction unit. The 7th concentric electrode 37 and the 8th concentric electrode 38, the 8th concentric electrode 38 and the 9th concentric electrode 39, the 9th concentric electrode 39 and the 10th concentric electrode 40, the 10th concentric electrode 40 and the 11th concentric electrode 41, the 11th concentric electrode 41 and the 12th concentric electrode 42, and the 12th concentric electrode 42 and the 13th concentric electrode 43 are respectively connected through resistors not shown (see FIG. 6) of the same resistance value (referred to as R2). The 7th concentric electrode 37 and the 13th concentric electrode 43, positioned at both ends of the second group of concentric electrodes, are connected to a third extraction electrode 48 and a fourth extraction electrode 49, respectively.

The 6th concentric electrode 36 is provided between the first group of concentric electrodes 44 and the second group of concentric electrodes 45 and is an independent electrode (independent concentric electrode) belonging to neither of the first group of concentric electrodes 44 and the second group of concentric electrodes 45. Therefore, the 6th concentric electrode 36 is insulated from its adjacent electrodes, the 5th concentric electrode 35 and the 7th concentric electrode 37. The 6th concentric electrode 36 is connected to a fifth extraction electrode 50. The first extraction electrode 46, the second extraction electrode 47, the third extraction electrode 48, the fourth extraction electrode 49, and the fifth extraction electrode 50, insulated from all concentric electrodes other than the concentric electrodes to which these extraction electrodes are respectively connected, are connected to the drive circuit 5 (see FIG. 1).

Figure 5:
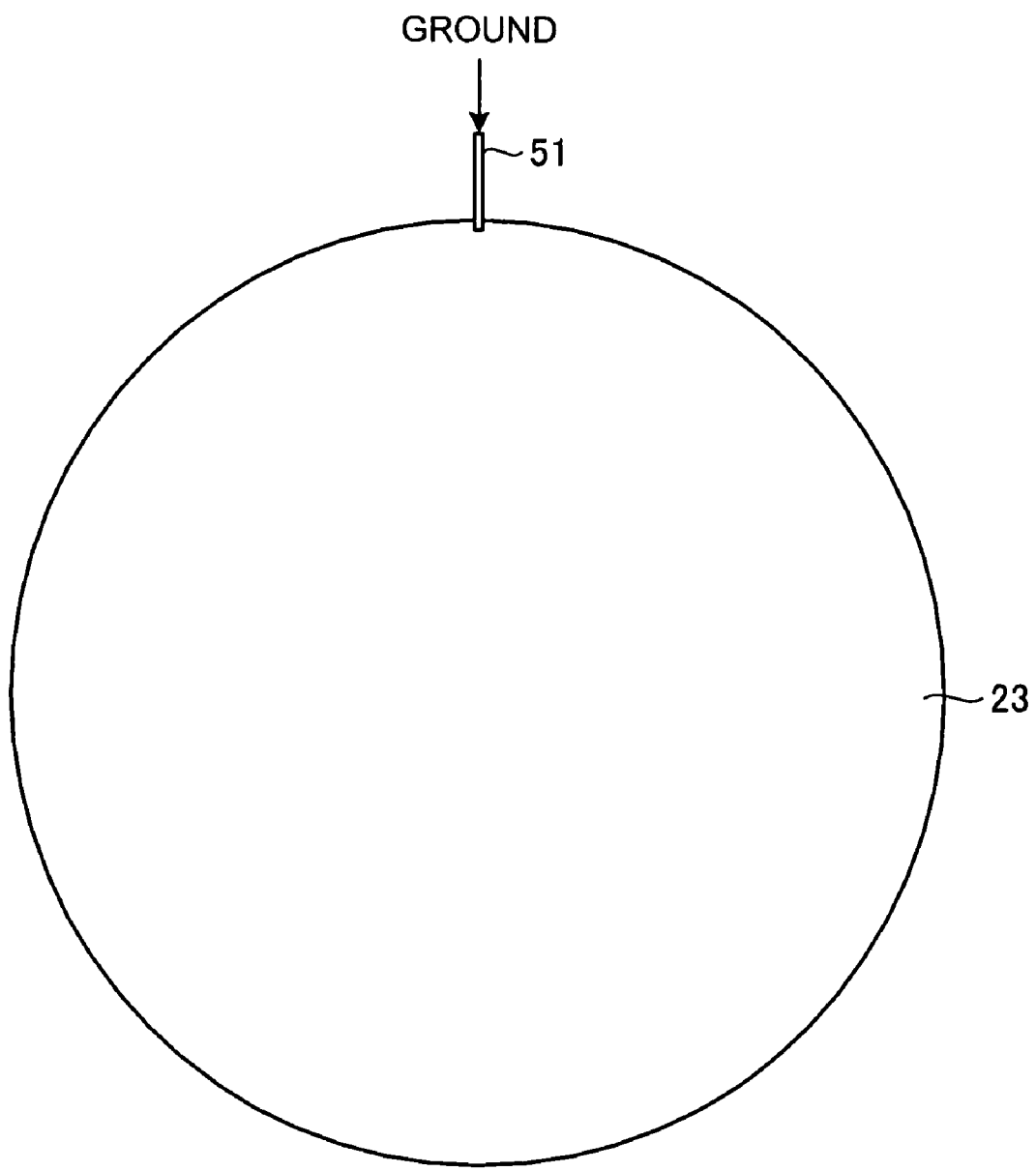
FIG. 5 is a diagram of a second electrode of the liquid crystal optical element according to a first embodiment of the present invention.

FIG. 5 is a diagram of a pattern of the second electrode 23. As shown in FIG. 5, in the first embodiment, the second electrode 23 is, for example, an electrode of uniformly low resistance in a round shape. The second electrode 23 is of the same size as, or a larger size than, that of the first electrode 21. The second electrode 23 is connected to a sixth extraction electrode 51. The sixth extraction electrode 51 is supplied with a ground voltage from the drive circuit 5. Here, it may be so arranged that a wave front aberration correction pattern for correcting a coma, spherical aberration, astigmatism, etc., will be provided over a whole or a part of the area of the second electrode 23.

Figure 6:
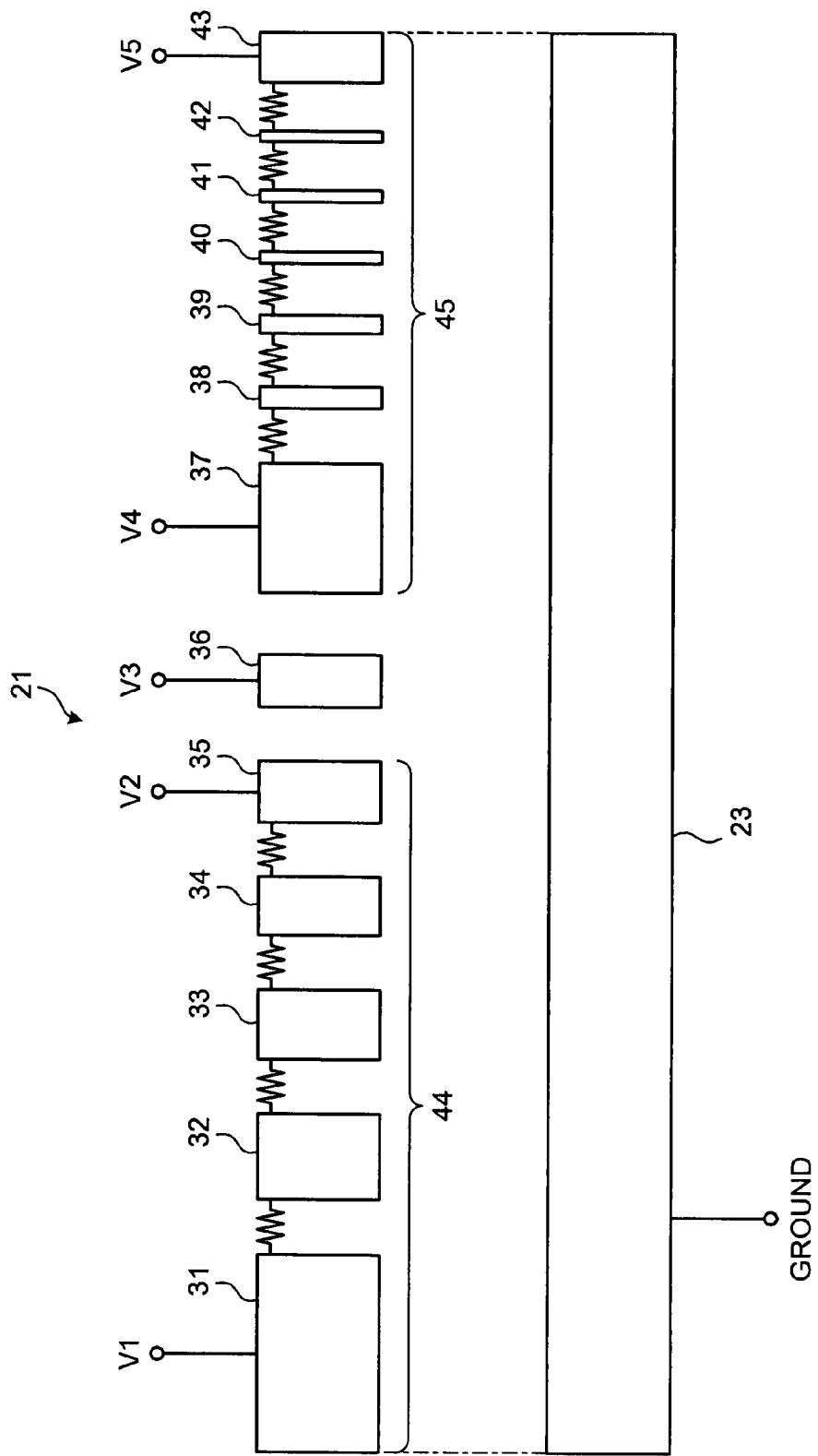
FIG. 6 is a diagram typically illustrating a relationship between electrodes and applied voltage of the liquid crystal optical element according to the first embodiment of the present invention.

FIG. 6 is a diagram typically illustrating a relationship between each of concentric electrodes 31 to 43 and the second electrode 23 and voltages applied between them. As shown in FIG. 6, the second electrode 23 is supplied with the ground voltage. The 1st concentric electrode 31 is supplied with a voltage of V1 relative to the ground voltage. The 5th concentric electrode 35 is supplied with a voltage of V2 relative to the ground voltage. The 6th concentric electrode 36 is supplied with a voltage of V3 relative to the ground voltage. The 7th concentric electrode 37 is supplied with a voltage of V4 relative to the ground voltage. The 13th concentric electrode 43 is supplied with a voltage of V5 relative to the ground voltage.

By controlling voltage values of V1 to V5, an in-plane distribution is caused to the voltage applied to the liquid crystal layer of the liquid crystal cell. As a result, the in-plane distribution is caused to the refractive index of the liquid crystal cell and the phase of the light passing through the liquid crystal cell changes depending on the location within the plane of the liquid crystal cell at which the light passes through. Namely, the liquid crystal cell functions as a wave front control element. As the voltage values of V1 to V5 are changed, the in-plane distribution of the voltage applied to the liquid crystal layer changes and the distribution of the refractive index within the plane of the liquid crystal cell changes. Here, since the 1st to 13th concentric electrodes 31 to 43 are in a concentric form, the in-plane refractive index changes in the concentric form. Since the liquid crystal is driven by AC, each voltage value of V1, V2, V3, V4, and V5 is effective value.

Values of V1 to V5 in the case of irradiating the blue laser light on the high density DVD are determined according to the following equations (1) and (2), where the reference bias is given as V0 and the division number (number of concentric electrodes) between V1 and V2 is given by n:

$$V1=V5=V0 \quad (1)$$

$$V3-V0=V4-V0=\{n/(n-1)\}(V2-V0) \quad (2)$$

Though not particularly limited hereto, according to the equations (1) and (2) above, an example of values of V1 to V5 when the first electrode 21 is configured as shown in FIG. 4 and FIG. 6 (n=5) is as follows: V1=V5=2.4 Vrms, V3=V4=1.8 Vrms, and V2=1.92 Vrms. The voltage value of the reference bias is 2.4 Vrms. The produced aberration and the correction aberration at such condition are shown in FIG. 7.

Figure 7:
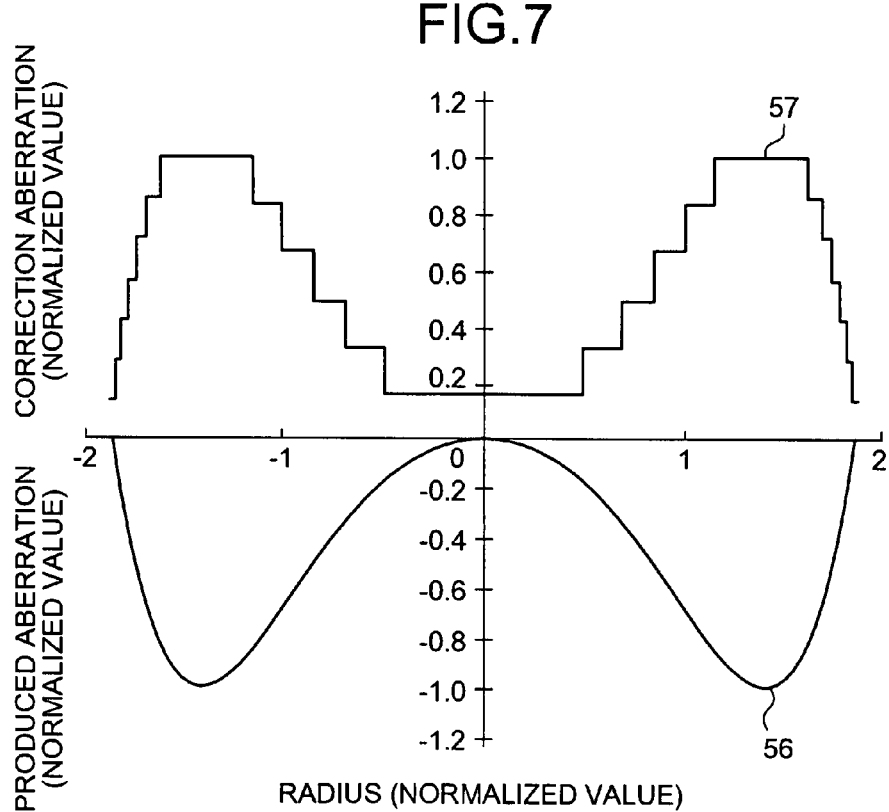
FIG. 7 is an explanatory diagram of a relationship between produced aberration and correction aberration by the liquid crystal optical element according to the first embodiment of the present invention.

However, in FIG. 7, the produced aberration and the correction aberration are expressed two-dimensionally, and the produced aberration volume and the correction aberration volume along the vertical axis and the distance in the radius direction along the horizontal axis are expressed in normalized values (the situation is the same with FIGS. 8 to 12). FIG. 7 shows a W-shaped produced aberration that gradually decreases and reaches its peak as the position shifts from the center of the objective lens 6 (see FIG. 1) halfway toward periphery and then gradually increases as the position shifts from there toward the periphery. As shown in FIG. 7, by generating an M-shaped correction aberration 57 that changes step by step as opposed to the W-shaped produced aberration 56, the aberration is offset and the residual aberration is reduced. Though this is not specifically shown, in the case of the M-shaped produced aberration that gradually increases and reaches its peak as the position shifts from the center of the objective lens 6 (see FIG. 1) halfway toward periphery and then gradually decreases as the position shifts from there toward the periphery, the aberration is offset and the residual aberration is reduced by generating a W-shaped correction aberration that changes step by step.

Figure 8:
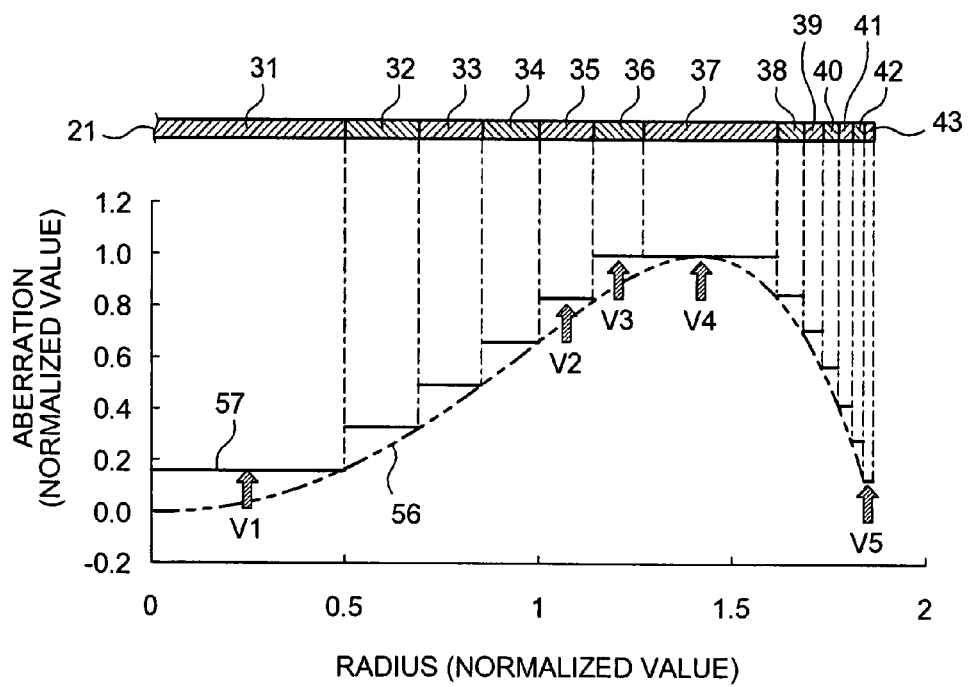
FIG. 8 is an explanatory diagram of an aberration by the liquid crystal optical element according to the first embodiment of the present invention.

FIG. 8 is a diagram formed by overlapping a part of the produced aberration 56 of FIG. 7 and its corresponding correction aberration 57, to see the degree of matching of the produced aberration and the correction aberration. However, FIG. 8 shows only such part of the aberrations that corresponds to the radius of the liquid crystal cell, to make the diagram easier-to-see (the situation is the same with FIG. 11 and FIGS. 16 to 19). Since the effective aperture (pupil aperture) of the objective lens 6 (see FIG. 1) is large in the case of irradiating the blue laser light on the high density DVD, the aberration correction is made over an entire effective area of the liquid crystal cell by providing a difference between V4 and V5.

Figure 9:
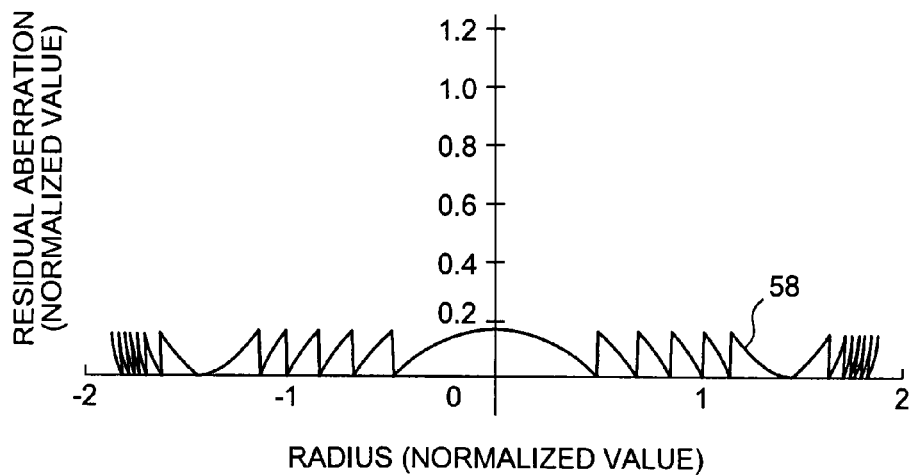
FIG. 9 is a diagram of residual aberration by the liquid crystal optical element according to the first embodiment of the present invention.

In other words, the first electrode 21 and the second electrode 23 are formed in such a manner that the 13th concentric electrode 43 is equal to or larger than the effective aperture (pupil aperture) of the objective lens 6 (see FIG. 1) for the blue laser light. The residual aberration 58 is shown in FIG. 9. Comparison of the residual aberration 58 of FIG. 9 with the produced aberration 56 of FIG. 7 illustrates that the aberration is sufficiently reduced.

On the other hand, values of V1 to V5 in the case of irradiating the red laser light on the conventional DVD are determined according to the following equations (3) and (4):

$$V1=V4=V5=V0 \quad (3)$$

$$V2-V0=2(V3-V0) \quad (4)$$

Figure 10:
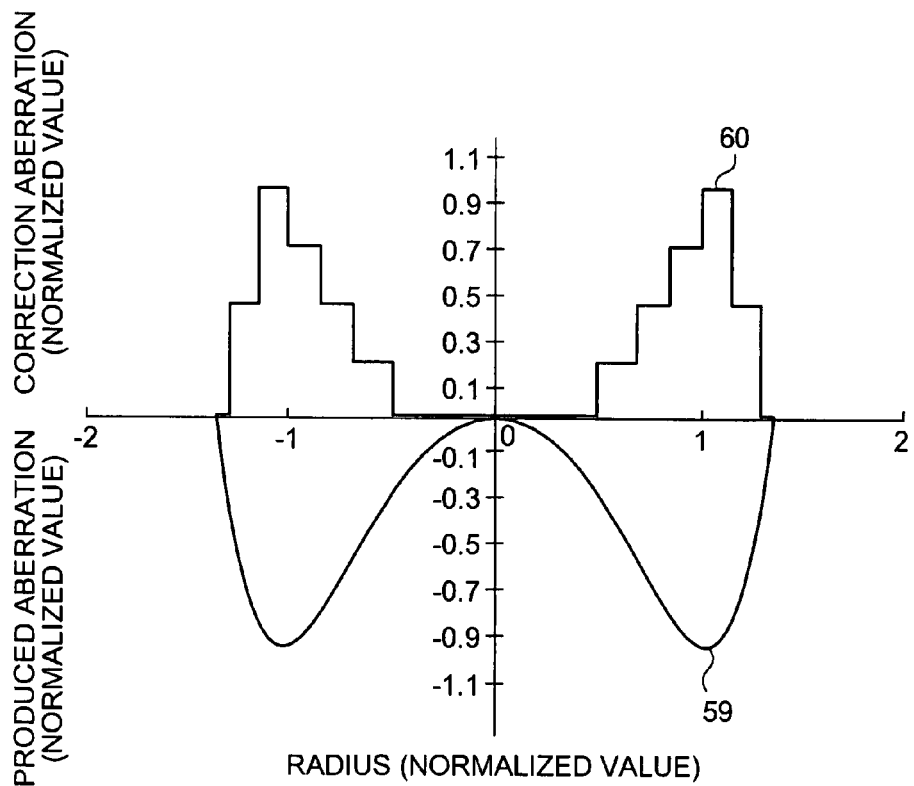
FIG. 10 is an explanatory diagram of the relationship between produced aberration and correction aberration by the liquid crystal optical element according to the first embodiment of the present invention.

Though not particularly limited hereto, according to the equations (3) and (4) above, an example of values of V1 to V5 when the first electrode 21 is configured as shown in FIG. 4 and FIG. 6 and the voltage value of the reference bias is set at 2.4 Vrms is as follows: V1=V4=V5=2.4 Vrms, V2=1.8 Vrms, V3=2.1 Vrms. The produced aberration and the correction aberration at such condition are shown in FIG. 10. As shown in FIG. 10, by generating an M-shaped correction aberration 60 that changes step by step as opposed to the W-shaped produced aberration 59, the aberration is offset and the residual aberration is reduced. Though this is not specifically shown, in the case of the M-shaped produced aberration, the aberration is offset and the residual aberration is reduced by generating a W-shaped correction aberration that changes step by step.

Figure 11:
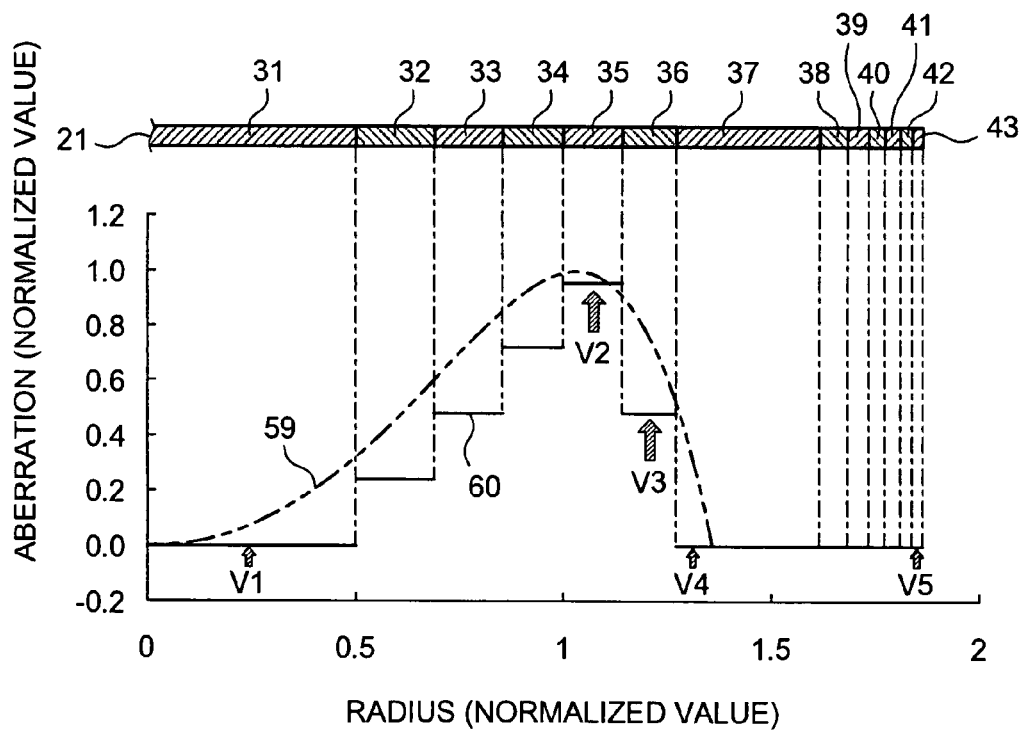
FIG. 11 is an explanatory diagram of aberration by the liquid crystal optical element according to the first embodiment of the present invention.

FIG. 11 is a diagram formed by overlapping a part of the produced aberration 59 of FIG. 10 and its corresponding correction aberration 60, to see the degree of matching of the produced aberration and the correction aberration. Since the effective aperture (pupil aperture) of the objective lens 6 (see FIG. 1) is small in the case of irradiating the red laser light on the conventional DVD, the aberration correction is nullified at the circumferential part of the effective area of the liquid crystal cell and the area to be aberration-corrected is made smaller by making V4 equal to V5.

Figure 12:
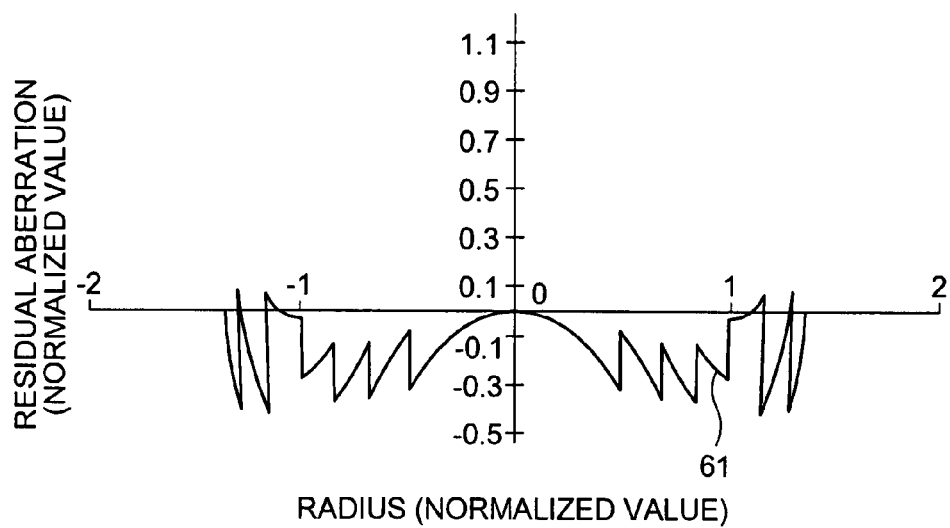
FIG. 12 is a diagram of residual aberration by the liquid crystal optical element according to the first embodiment of the present invention.

Since the peak position of the produced aberration 59 is closer to the center of the liquid crystal cell as compared with the case of the blue laser light, the peak position of the correction aberration 60 is made closer to the center of the liquid crystal cell as compared with the case of the blue laser light by setting V3 at the voltage value between V2 and V4. Therefore, the first electrode 21 and the second electrode 23 are formed in such a manner that the 6th concentric electrode (independent concentric electrode) 36 is smaller than the effective aperture (pupil aperture) of the objective lens 6 (see FIG. 1) for the red laser light and at the same time, at least a part of the 7th concentric electrode 37 is larger than the effective aperture (pupil aperture) of the objective lens 6 (see FIG. 1) for the red laser light. The residual aberration 61 is shown in FIG. 12. Comparison of the residual aberration 61 of FIG. 12 with the produced aberration 59 of FIG. 10 illustrates that the aberration is sufficiently reduced.

Each of the widths of the concentric electrodes 31 to 43, the resistance value of the resistor R1 connecting the 1st to 5th concentric electrodes 31 to 35, the resistance value of the resistor R2 connecting the 7th to 13th concentric electrodes 37 to 43, and each of the voltage values of V1 to V5 are appropriately selected so that the correction aberrations 57 and 60 can be obtained of the pattern as close as possible to the phase opposite to that of either one or both of the produced aberration 56 in the case of the blue laser light and the produced aberration 59 in the case of the red laser light. In such selection, the resistance value R1 and the resistance value R2 may be same or may be different. All voltage values of V1 to V5 may be different from one another. All values of the resistors connecting the concentric electrodes 31 to 35 belonging to the first group of concentric electrodes may not be same and all values of the resistors connecting the concentric electrodes 37 to 43 belonging to the second group of concentric electrodes may not be same.

Second Embodiment

Figure 13:
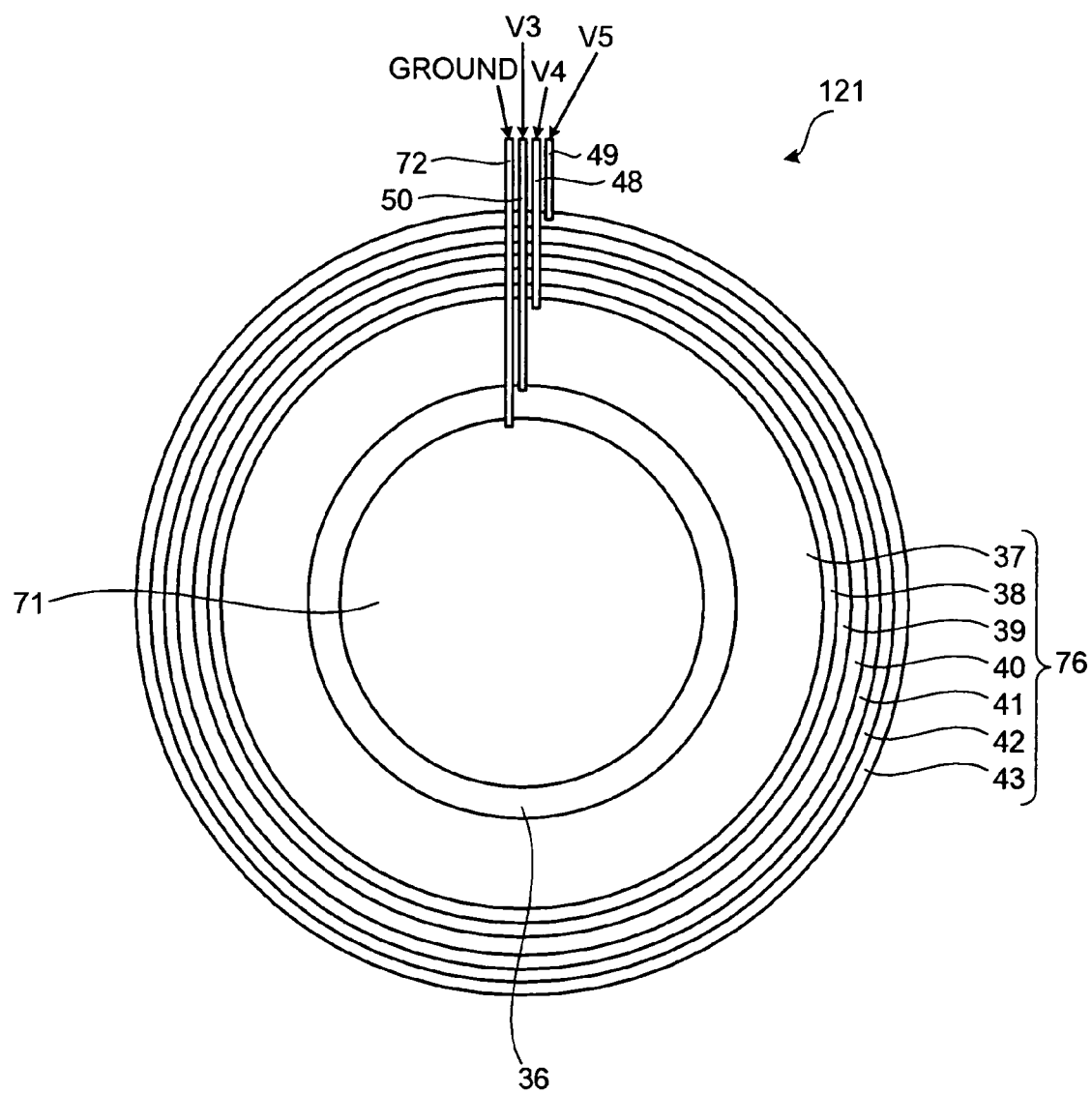
FIG. 13 is a diagram of the first electrode of the liquid crystal optical element according to a second embodiment of the present invention.
Figure 14:
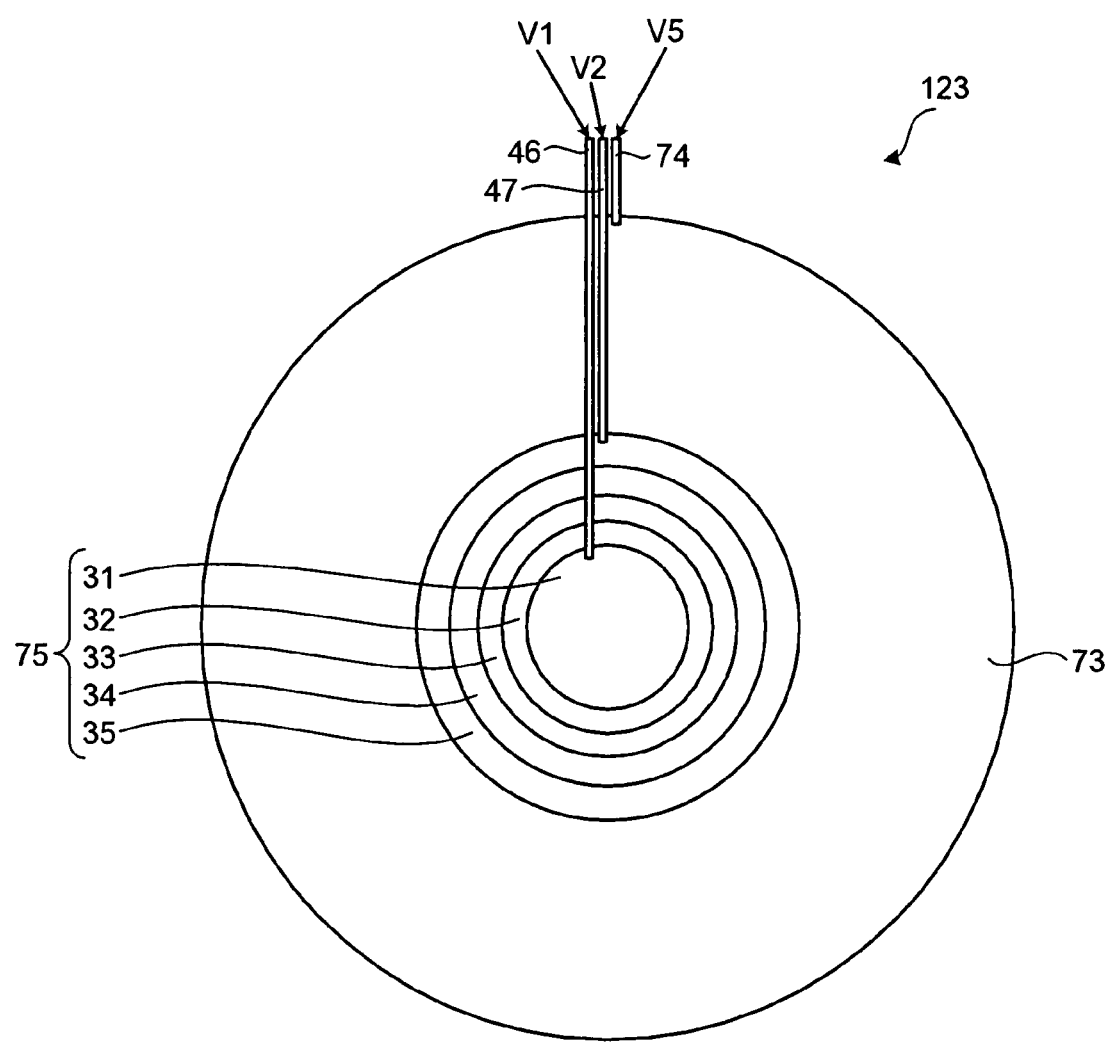
FIG. 14 is a diagram of the second electrode of the liquid crystal optical element according to a second embodiment of the present invention.
Figure 15:
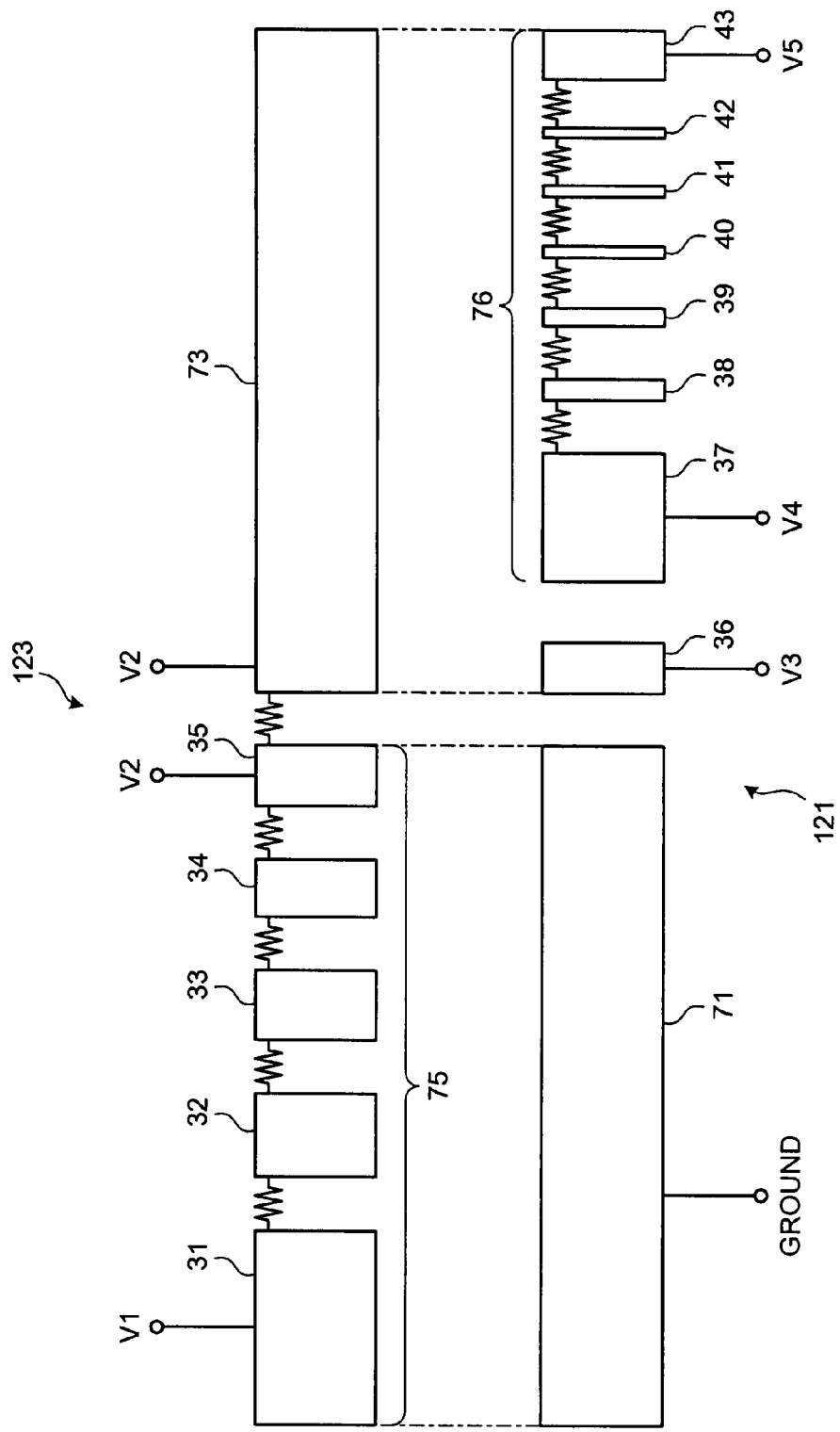
FIG. 15 is a diagram typically illustrating the relationship between electrodes and applied voltage of the liquid crystal optical element according to the second embodiment of the present invention.

In a second embodiment, the concentric electrodes are provided for both of the first and second electrodes. The same configuration as that of the first embodiment will be affixed with the same numeral as that used in the first embodiment, with the description thereof being omitted. FIGS. 13 and 14 are diagrams of pattern of a first electrode 121 and a second electrode 123, respectively, in the second embodiment. FIG. 15 is a typical diagram of relationship between the first and second electrodes 121 and 123 and the voltages applied between them.

As shown in FIG. 13, the first electrode 121 has the 6th concentric electrode (independent concentric electrode) 36 and the 7th to 13th concentric electrodes 37 to 43 connected through resistors in the same way as in the first embodiment. The inner side of the 6th concentric electrode 36, namely, the area in which the 1st to 5th concentric electrodes 31 to 35 are provided in the first embodiment, has become a 14th concentric electrode 71 of a uniform round shape.

A space of, for example, 3 μm is provided between the 14th concentric electrode 71 and 6th concentric electrode 36. The 14th concentric electrode 71 is connected to a seventh extraction electrode 72. As shown in FIG. 15, the 14th concentric electrode 71 is supplied with the ground voltage from the drive circuit 5 through the seventh extraction electrode 72. The 6th concentric electrode 36, the 7th concentric electrode 37, and the 13th concentric electrode 43 are supplied with the voltages of V3, V4, and V5 relative to the ground voltage through the fifth extraction electrode 50, the third extraction electrode 48, and the fourth extraction electrode 49, respectively.

As shown in FIG. 14, the second electrode 123 has the 1st to 5th concentric electrodes 31 to 35. The outer side of the 5th concentric electrode 35, namely, the area in which the 6th to 13th concentric electrodes 36 to 43 are provided in the first embodiment, has become a 15th concentric electrode 73 of a uniform ring shape. A space of, for example, 3 μm is provided between the 15th concentric electrode 73 and 5th concentric electrode 35. The 15th concentric electrode 73 is connected to an eighth extraction electrode 74.

As shown in FIG. 15, the 15th concentric electrode 73 is supplied with a voltage of V2 relative to the ground voltage from the drive circuit 5 through the eighth extraction electrode 74. The 1st concentric electrode 31 and the 5th concentric electrode 35 are supplied with the voltages of V1 and V2 relative to the ground voltage through the first extraction electrode 46 and the second extraction electrode 47, respectively. In the second embodiment, the 1st to 5th concentric electrodes 31 to 35 correspond to the first group of concentric electrodes 75 and the 7th to 13th concentric electrodes 37 to 43 correspond to the second group of concentric electrodes 76.

The 14th concentric electrode 71 becomes an electrode opposing the first group of concentric electrodes 75 and the 15th concentric electrode 73 becomes an electrode opposing the second group of concentric electrodes 76. Here, it may be so arranged that a wave front aberration correction pattern for correcting a coma, spherical aberration, astigmatism, etc., will be provided over a whole or a part of the area of the 14th concentric electrode 71. Same thing can be said with the 15th concentric electrode 73.

In the second embodiment, the first correction unit is composed of the first group of concentric electrodes 75, the 14th concentric electrode 71, the second group of concentric electrodes 76, and the 15th concentric electrode 73. The second correction unit is composed of the first group of concentric electrodes 75 and the 14th concentric electrode 71. Since other configurations are same as in the first embodiment, repetitive description is omitted.

In the same way as in the first embodiment, values of V1 to V5 in the case of irradiating the blue laser light onto the high density DVD is determined according to the equations (1) and (2) above and values of V1 to V5 in the case of irradiating the red laser light onto the conventional DVD is determined according to the equations (3) and (4) above. Therefore, though not particularly limited hereto, a specific example of values of V1 to V5 becomes same as in the first embodiment.

Figure 16:
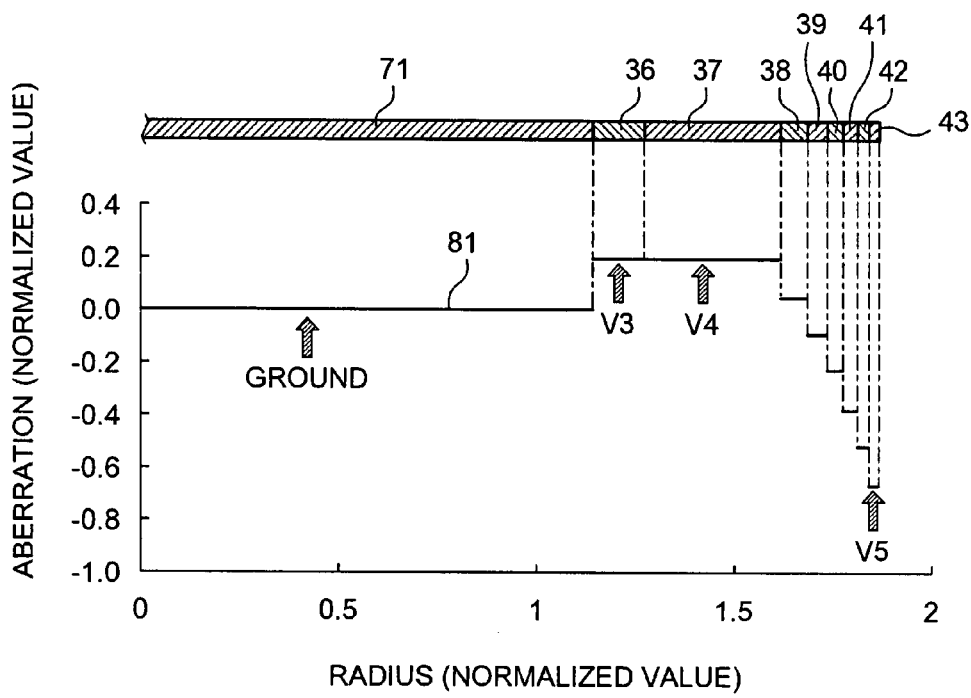
FIG. 16 is an explanatory diagram of an aberration by the liquid crystal optical element according to the second embodiment of the present invention.
Figure 17:
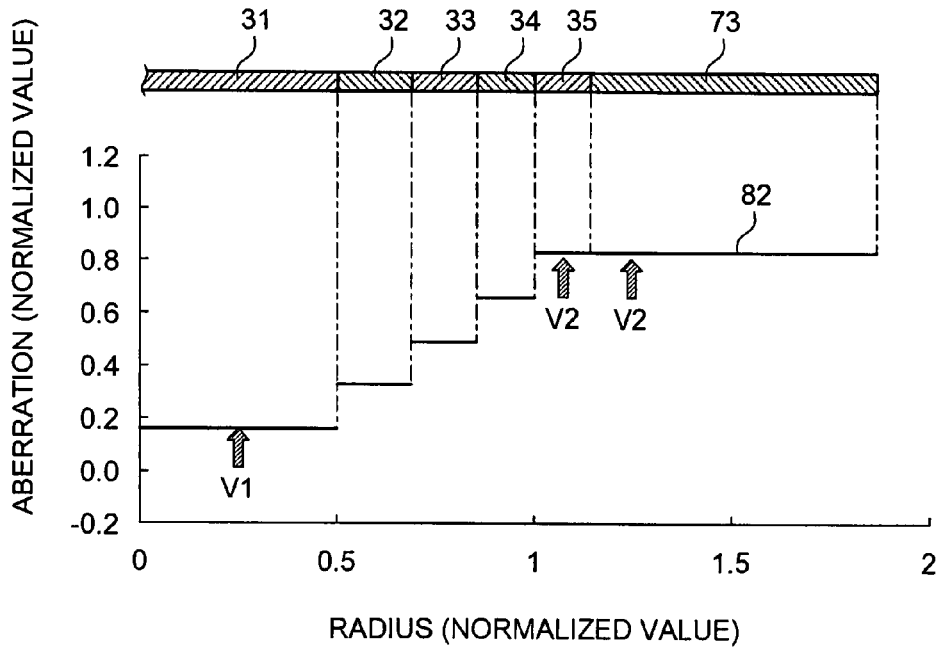
FIG. 17 is an explanatory diagram of an aberration by the liquid crystal optical element according to the second embodiment of the present invention.

FIGS. 16 and 17 are diagrams of contribution by the first electrode 121 and the second electrode 123, respectively, to the correction aberration when irradiating the blue laser light onto the high density DVD. In the second embodiment, at each part at which the concentric electrodes 71, 36, and 37 to 43 making up the first electrode 121 and the concentric electrodes 31 to 35 and 73 making up the second electrode 123 are opposed to each other, the voltage applied to the liquid crystal cell is same as in the first embodiment. Therefore, the correction aberration formed by synthesizing the contribution 81 by the first electrode 121 to the correction aberration shown in FIG. 16 and the contribution 82 by the second electrode 123 to the correction aberration shown in FIG. 17 is same as the correction aberration 56 shown in FIG. 8.

Figure 18:
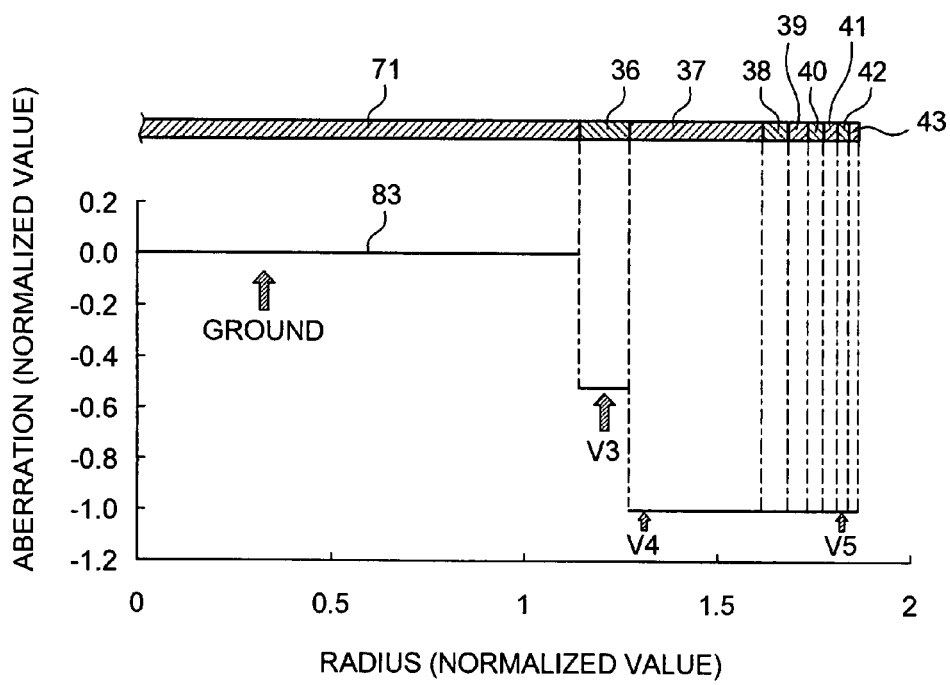
FIG. 18 is an explanatory diagram of aberration by the liquid crystal optical element according to the second embodiment of the present invention.
Figure 19:
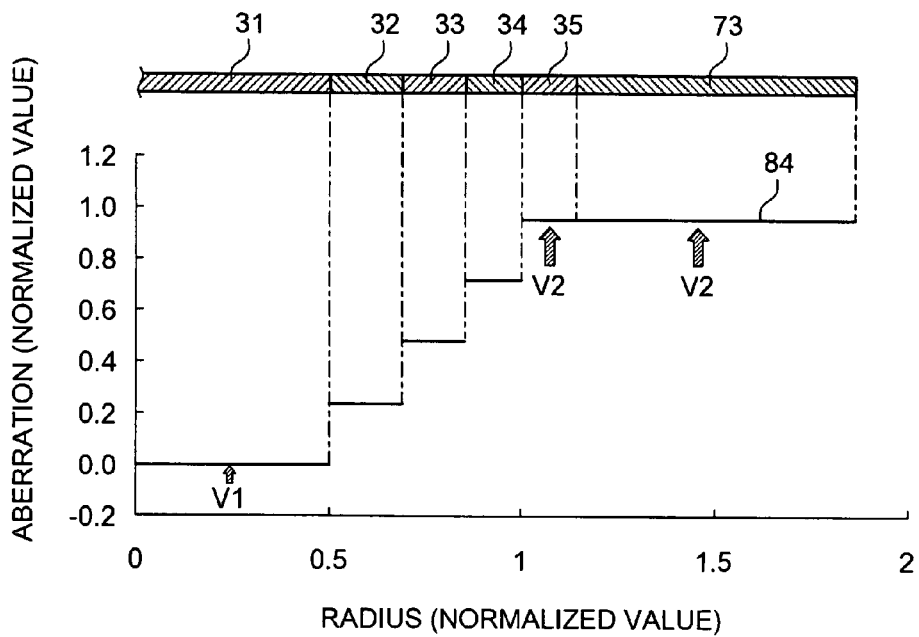
FIG. 19 is an explanatory diagram of aberration by the liquid crystal optical element according to the second embodiment of the present invention.
Figure 20:
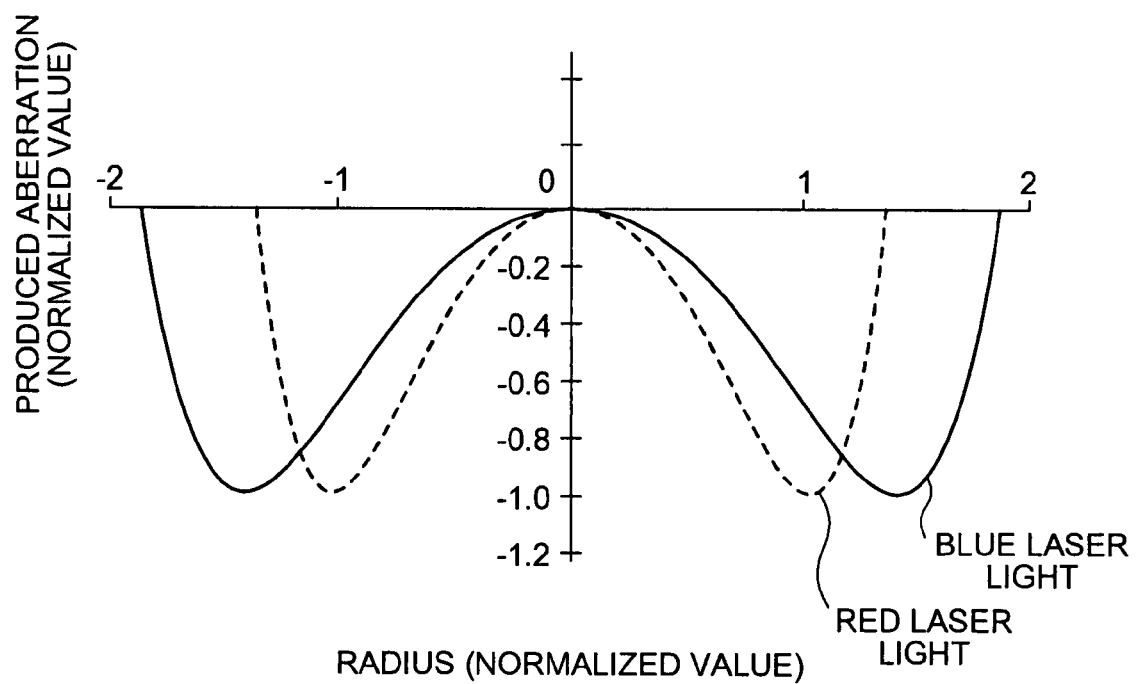
FIG. 20 is a diagram of aberration produced in the case of using a blue laser light and aberration produced in the case of using a red laser light.

FIGS. 18 and 19 are diagrams of contribution by the first electrode 121 and the second electrode 123, respectively, to the correction aberration when irradiating the red laser light onto the conventional DVD. The correction aberration formed by synthesizing the contribution 83 by the first electrode 121 to the correction aberration shown in FIG. 18 and the contribution 84 by the second electrode 123 to the correction aberration shown in FIG. 19 is same as the correction aberration 60 shown in FIG. 11.

As described above, the embodiments have the effect of solving the difference in the effective aperture of the objective lens in the case of using various types of laser lights such as the blue laser light, the red laser light, and the infrared laser light, and the difference in the peak position of the spherical aberration produced in respective cases.

In place of the configuration of connecting a plurality of low-resistance concentric electrodes belonging to same group of concentric electrodes through resistors as in the present embodiments, it is conceivable to have the configuration of forming a plurality of concentric electrodes on a high-resistance transparent electrode having a resistance gradient and causing the in-plane distribution to the voltage applied to the liquid crystal layer by the voltage drop caused when different voltages are applied to these electrodes, thereby changing the in-plane distribution of the refractive index of the liquid crystal cell and generating the correction aberration.

However, such configuration can not satisfactorily correct both the difference in the peak position of the produced aberration and the difference in the effective aperture of the objective lens between the case of irradiating the blue laser light onto the high density DVD and in the case of irradiating the red laser light onto the conventional DVD. Both the difference in the peak position of the produced aberration and the difference in the effective aperture of the objective lens can be solved by providing an independent concentric electrode (6th concentric electrode 36) and individually driving the independent concentric electrode and each group of concentric electrodes as according to the present embodiments.

The present invention is not limited to the embodiments described above and can be changed in various ways. For example, in the first embodiment, the number of groups of concentric electrodes making up the first electrode 21 may be 3 or more. Likewise, in the second embodiment, the number of groups of concentric electrodes making up the first electrode 121 and the second electrode 123 may respectively be 2 or more. In the second embodiment, the area of the 14th concentric electrode 71 may be changed to a group of concentric electrodes with a plurality of concentric electrodes connected through resistors or may be composed of a plurality of independent concentric electrodes. Same thing can be said of the area of the 15th concentric electrode 73.

Furthermore, in both embodiments, the number of the concentric electrodes belonging to each group of concentric electrodes may be increased or decreased and the number of independent concentric electrodes may be increased to 2 or more. In the second embodiment, the independent concentric electrode may be provided only on the second electrode 123 or on both of the first electrode 121 and the second electrode 123. Numerical values described in the embodiments are examples and the present invention is not limited by these values.

INDUSTRIAL APPLICABILITY

As seen above, the liquid crystal optical element according to the present invention is useful for devices requiring correction of aberration and in particular, is suitable for the optical head device built in the device for recording the data on the optical disk and reading out the data recorded on the optical disk.

The invention claimed is:

1. A liquid crystal optical element comprising:
   a liquid crystal cell having a first transparent substrate with a first electrode, a second transparent substrate with a second electrode, and a liquid crystal layer encapsulated between the first transparent substrate and the second transparent substrate; and
   a power source unit supplying a voltage to the first electrode and the second electrode, wherein
   depending on the voltage applied between the first electrode and the second electrode by the power source unit, in-plane refractive index distribution of the liquid crystal cell changes,
   the first electrode is composed of a plurality of concentric electrodes concentrically arranged from a center of the first transparent substrate toward a periphery of the first transparent substrate,
   the plurality of concentric electrodes are grouped into at least two groups of concentric electrodes,
   among the concentric electrodes belonging to each group of concentric electrodes, the concentric electrodes that are adjacent to each other are connected through a resistor, and
   the concentric electrodes at each end of the concentric electrodes belonging to each group of concentric electrodes are connected to the power source unit through an extraction electrode,
   wherein an independent concentric electrode of a circular shape concentric with the concentric electrodes is further provided on the first transparent substrate, independently without belonging to any group of concentric electrodes, and the independent concentric electrode is connected to the power source unit through an extraction electrode, and
   wherein the independent concentric electrode is provided between a first group of concentric electrodes that is near a center of the liquid crystal cell and a second group of concentric electrodes that is near a periphery of the liquid crystal cell.

2. The liquid crystal optical element according to claim 1, wherein
   the concentric electrodes belonging to the first group of concentric electrodes have widths causing a voltage distribution, between the concentric electrodes and the second electrode, that generates an aberration having a phase nearly opposite to that of an aberration that increases from the center of the liquid crystal cell halfway toward the periphery.

3. The liquid crystal optical element according to claim 1, wherein
   the concentric electrodes belonging to the second group of concentric electrodes have widths causing a voltage distribution, between the concentric electrodes and the second electrode, that generates an aberration having a phase nearly opposite to that of an aberration that decreases from a midpoint, between the center of the liquid crystal cell and the periphery, to the periphery.

4. The liquid crystal optical element according to claim 1, wherein
   the concentric electrodes belonging to the first group of concentric electrodes have widths causing a voltage distribution, between the concentric electrodes and the second electrode, that generates an aberration having a phase nearly opposite to that of an aberration that decreases from the center of the liquid crystal cell halfway toward the periphery.

5. The liquid crystal optical element according to claim 1, wherein
   the concentric electrodes belonging to the second group of concentric electrodes have widths causing a voltage distribution, between the concentric electrodes and the second electrode, that generates an aberration having a phase nearly opposite to that of an aberration that increases from a midpoint, between the center of the liquid crystal cell and the periphery, to the periphery.

6. The liquid crystal optical element according to claim 1, wherein
   the power source unit supplies the extraction electrode connected to the independent concentric electrode with a voltage equal to the voltage supplied to one of the extraction electrodes connected to one of the groups of concentric electrodes.

7. The liquid crystal optical element according to claim 1, wherein
   the power source unit, when correcting a spherical aberration of a disk with a small effective aperture of an objective lens, supplies the extraction electrode connected to the independent concentric electrode with a voltage between the voltage supplied to the extraction electrode connected to the concentric electrode, among the concentric electrodes belonging to the first group of concentric electrodes, that is located next to the independent concentric electrode and the voltage supplied to the extraction electrode connected to the concentric electrode, among the concentric electrodes belonging to the second group of concentric electrodes, that is located next to the independent concentric electrode.

8. The liquid crystal optical element according to claim 1, wherein
   the power source unit, when correcting a spherical aberration of a disk with a large effective aperture of an objective lens, supplies the extraction electrode connected to the independent concentric electrode with a voltage equal to the voltage supplied to the extraction electrode connected to the concentric electrode among the concentric electrodes belonging to the second group of concentric electrodes that is located next to the independent concentric electrode.

9. The liquid crystal optical element according to claim 8, wherein
resistance values of the resistors connecting every two concentric electrodes belonging to one group of concentric electrodes are the same.

10. The liquid crystal optical element according to claim 9, wherein
resistance values of the resistors connecting every two concentric electrodes belonging to each group of concentric electrodes are the same.

11. The liquid crystal optical element according to claim 1, wherein
resistance values of the resistors connecting every two concentric electrodes belonging to one group of concentric electrodes are the same.

12. The liquid crystal optical element according to claim 11, wherein
resistance values of the resistors connecting every two concentric electrodes belonging to each group of concentric electrodes are the same.

13. A liquid crystal optical element comprising:
a liquid crystal cell having a first transparent substrate with a first electrode, a second transparent substrate with a second electrode, and a liquid crystal layer encapsulated between the first transparent substrate and the second transparent substrate; and
a power source unit supplying a voltage to the first electrode and the second electrode, wherein
depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, some of which are grouped to form a group of concentric electrodes,
the second electrode is composed of a plurality of concentric electrodes concentrically arranged from a center of the second transparent substrate toward a periphery, some of which are grouped to form a group of concentric electrodes,
the concentric electrodes that are adjacent among the concentric electrodes belonging to each group of concentric electrodes are connected through a resistor, and
the concentric electrodes at each end of the concentric electrodes belonging to each group of concentric electrodes are connected to the power source unit through an extraction electrode,
wherein an independent concentric electrode of a circular shape concentric with the concentric electrodes on the first transparent substrate is further provided on the first transparent substrate, independently without belonging to any group of concentric electrodes on the first transparent substrate, and the independent concentric electrode is connected to the power source unit through an extraction electrode, and
wherein, when the group of concentric electrodes arranged near the center of the liquid crystal cell on the second transparent substrate is designated as a first group of concentric electrodes and the group of concentric electrodes arranged near the periphery of the liquid crystal cell on the first transparent substrate is designated as a second group of concentric electrodes, the independent concentric electrode is provided between a concentric electrode on the first transparent substrate that opposes the first group of concentric electrodes and the second group of concentric electrodes.

14. The liquid crystal optical element according to claim 13, wherein
the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that increases from the center of the liquid crystal cell halfway toward the periphery.

15. The liquid crystal optical element according to claim 13, wherein
the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that decreases from a midpoint, between the center of the liquid crystal cell and the periphery, to the periphery.

16. The liquid crystal optical element according to claim 13, wherein
the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that decreases from the center of the liquid crystal cell halfway toward the periphery.

17. The liquid crystal optical element according to claim 13, wherein
the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that increases from a midpoint, between the center of the liquid crystal cell and the periphery, to the periphery.

18. The liquid crystal optical element according to claim 13, wherein
the power source unit supplies the extraction electrode connected to the independent concentric electrode with a voltage equal to the voltage supplied to one of the extraction electrodes connected to the second group of concentric electrodes.

19. The liquid crystal optical element according to claim 13, wherein
the power source unit, when correcting a spherical aberration of a disk with a small effective aperture of an objective lens, supplies the extraction electrode connected to the independent concentric electrode with a voltage between the voltage supplied to the extraction electrode connected to the concentric electrode among the concentric electrodes belonging to the first group of concentric electrodes that is located close to the independent concentric electrode and the voltage supplied to the extraction electrode connected to the concentric electrode among the concentric electrodes belonging to the second group of concentric electrodes that is located next to the independent concentric electrode.

20. The liquid crystal optical element according to claim 13, wherein
resistance values of the resistors connecting every two concentric electrodes belonging to one group of concentric electrodes are the same.

21. A liquid crystal optical element comprising:
a liquid crystal cell having a first transparent substrate with a first electrode, a second transparent substrate with a second electrode, and a liquid crystal layer encapsulated between the first transparent substrate and the second transparent substrate; and
a power source unit supplying a voltage to the first electrode and the second electrode, wherein
depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate and the plurality of concentric electrodes composing the first electrode are grouped into at least two groups of concentric electrodes,
the second electrode is composed of a plurality of concentric electrodes concentrically arranged from the center of the second transparent substrate toward the periphery and the plurality of concentric electrodes composing the second electrode are grouped into at least two groups of concentric electrodes,
among the concentric electrodes belonging to each group of concentric electrodes, the concentric electrodes that are adjacent to each other are connected through a resistor, and
the concentric electrodes at each end of the concentric electrodes belonging to each group of concentric electrodes are connected to the power source unit through an extraction electrode,
wherein an independent concentric electrode of a circular shape concentric with the concentric electrodes on the first transparent substrate is further provided on the first transparent substrate, independently without belonging to any group of concentric electrodes on the first transparent substrate, and the independent concentric electrode is connected to the power source unit through an extraction electrode, and
wherein, when among the plurality of groups of concentric electrodes provided on the first transparent substrate, the group of concentric electrodes arranged near the center of the liquid crystal cell is designated as a first group of concentric electrodes and the group of concentric electrodes arranged near the periphery of the liquid crystal cell is designated as a second group of concentric electrodes, and among the plurality of groups of concentric electrodes provided on the second transparent substrate, the group of concentric electrodes arranged near the center of the liquid crystal cell is designated as a third group of concentric electrodes and the group of concentric electrodes arranged near the periphery of the liquid crystal cell is designated as a fourth group of concentric electrodes, the independent concentric electrode is provided between the first group of concentric electrodes and the second group of concentric electrodes.

22. The liquid crystal optical element according to claim 21, wherein
the concentric electrodes belonging to the third group of concentric electrodes have widths causing a voltage distribution, between the concentric electrodes and the first group of concentric electrodes, that generates an aberration having a phase nearly opposite to that of an aberration that increases from the center of the liquid crystal cell halfway toward the periphery.

23. The liquid crystal optical element according to claim 21, wherein
the concentric electrodes belonging to the second group of concentric electrodes have widths causing a voltage distribution, between the concentric electrodes and the fourth group of concentric electrodes, that generates an aberration having a phase nearly opposite to that of an aberration that decreases from a midpoint, between the center of the liquid crystal cell and the periphery, to the periphery.

24. The liquid crystal optical element according to claim 21, wherein
the concentric electrodes belonging to the third group of concentric electrodes have widths causing a voltage distribution, between the concentric electrodes and the first group of concentric electrodes, that generates an aberration having a phase nearly opposite to that of an aberration that decreases from the center of the liquid crystal cell halfway toward the periphery.

25. The liquid crystal optical element according to claim 21, wherein
the concentric electrodes belonging to the second group of concentric electrodes have widths causing a voltage distribution, between the concentric electrodes and the fourth group of concentric electrodes, that generates an aberration having a phase nearly opposite to that of an aberration that increases from a midpoint, between the center of the liquid crystal cell and the periphery, to the periphery.

26. The liquid crystal optical element according to claim 21, wherein
the power source unit supplies the extraction electrode connected to the independent concentric electrode with a voltage equal to the voltage supplied to one of the extraction electrodes connected to one of the groups of concentric electrodes provided on the first transparent substrate.

27. The liquid crystal optical element according to claim 21, wherein
the power source unit, when correcting a spherical aberration of a disk with a small effective aperture of an objective lens, supplies the extraction electrode connected to the independent concentric electrode with a voltage between the voltage supplied to the extraction electrode connected to the concentric electrode among the concentric electrodes belonging to the third group of concentric electrodes that is located close to the independent concentric electrode and the voltage supplied to the extraction electrode connected to the concentric electrode among the concentric electrodes belonging to the second group of concentric electrodes that is located next to the independent concentric electrode.

28. The liquid crystal optical element according to claim 21, wherein
resistance values of the resistors connecting every two concentric electrodes belonging to one group of concentric electrodes are the same.

29. A liquid crystal optical element comprising:
a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate and the plurality of concentric electrodes making up the first electrode are divided into groups of concentric electrodes, at least two, the concentric electrodes that are adjacent among the concentric electrodes belonging to each group of concentric electrodes are connected through a resistor, a first correction unit that corrects spherical aberration of a disk with a large effective aperture of an objective lens is composed of all of the groups of concentric electrodes, and wherein a second correction unit that corrects the spherical aberration of the disk with a small effective aperture of the objective lens is composed of, among the groups of concentric electrodes, the group of concentric electrodes arranged from the center of the first transparent substrate halfway toward the periphery, wherein an independent concentric electrode of a circular shape concentric with the concentric electrodes is further provided on the first transparent substrate, independently without belonging to any group of concentric electrodes, and wherein the independent concentric electrode is provided between one of the groups of concentric electrodes and another one of the groups of concentric electrodes.

30. The liquid crystal optical element according to claim 29, wherein the first correction unit is composed of a first group of concentric electrodes near the center of the liquid crystal cell and a second group of concentric electrodes near the periphery of the liquid crystal cell, and the second correction unit is composed of the first group of concentric electrodes.

31. The liquid crystal optical element according to claim 30, wherein the concentric electrodes belonging to the first group of concentric electrodes have widths causing a voltage distribution, between the concentric electrodes and the second electrode, that generates an aberration having a phase nearly opposite to that of an aberration that increases from the center of the liquid crystal cell halfway toward the periphery.

32. The liquid crystal optical element according to claim 30, wherein the concentric electrodes belonging to the second group of concentric electrodes have widths causing a voltage distribution, between the concentric electrodes and the second electrode, that generates an aberration having a phase nearly opposite to that of an aberration that decreases from a midpoint, between the center of the liquid crystal cell and the periphery, to the periphery.

33. The liquid crystal optical element according to claim 30, wherein the concentric electrodes belonging to the first group of concentric electrodes have widths causing a voltage distribution, between the concentric electrodes and the second electrode, that generates an aberration having a phase nearly opposite to that of an aberration that decreases from the center of the liquid crystal cell halfway toward the periphery.

34. The liquid crystal optical element according to claim 30, wherein the concentric electrodes belonging to the second group of concentric electrodes have widths causing a voltage distribution, between the concentric electrodes and the second electrode, that generates an aberration having a phase nearly opposite to that of an aberration that increases from a midpoint, between the center of the liquid crystal cell and the periphery, to the periphery.

35. The liquid crystal optical element according to claim 30, wherein the power source unit, when correcting a spherical aberration of a disk with a small effective aperture of an objective lens, supplies the independent concentric electrode with a voltage between the voltage supplied to the concentric electrode among the concentric electrodes belonging to the first group of concentric electrodes that is located next to the independent concentric electrode and the voltage supplied to the concentric electrode among the concentric electrodes belonging to the second group of concentric electrodes that is located next to the independent concentric electrode.

36. The liquid crystal optical element according to claim 30, wherein the power source unit, when correcting a spherical aberration of a disk with a large effective aperture of an objective lens, supplies the independent concentric electrode with a voltage equal to the voltage supplied to the concentric electrode among the concentric electrodes belonging to the second group of concentric electrodes that is located next to the independent concentric electrode.

37. The liquid crystal optical element according to claim 29, wherein resistance values of the resistors connecting every two concentric electrodes belonging to one group of concentric electrodes are the same.

38. A liquid crystal optical element comprising:

a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate, some of which are grouped to form a group of concentric electrodes, the second electrode is composed of a plurality of concentric electrodes concentrically arranged from a center of the second transparent substrate toward a periphery, some of which are grouped to form a group of concentric electrodes, the concentric electrodes that are adjacent among the concentric electrodes belonging to each group of concentric electrodes are connected through a resistor, a first correction unit that corrects spherical aberration of a disk with a large effective aperture of an objective lens is composed of all of the groups of concentric electrodes, and wherein a second correction unit that corrects the spherical aberration of the disk with a small effective aperture of the objective lens is composed of the group of concentric electrodes arranged from the center of the liquid crystal cell halfway toward the periphery, wherein an independent concentric electrode of a circular shape concentric with the concentric electrodes on the first transparent substrate is further provided on the first transparent substrate, independently without belonging to any group of concentric electrodes on the first transparent substrate, and wherein, when the group of concentric electrodes arranged near the center of the liquid crystal cell on the second transparent substrate is designated as a first group of concentric electrodes and the group of concentric electrodes arranged near the periphery of the liquid crystal cell on the first transparent substrate is designated as a second group of concentric electrodes, the independent concentric electrode is provided between a concentric electrode on the first transparent substrate that opposes the first group of concentric electrodes and the second group of concentric electrodes.

39. The liquid crystal optical element according to claim 38, wherein the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that increases from the center of the liquid crystal cell halfway toward the periphery.

40. The liquid crystal optical element according to claim 38, wherein the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that decreases from a midpoint, between the center of the liquid crystal cell and the periphery, to the periphery.

41. The liquid crystal optical element according to claim 38, wherein the concentric electrodes belonging to the first group of concentric electrodes have widths causing a voltage distribution, between the concentric electrodes and an opposing concentric electrode on the first transparent substrate, that generates an aberration having a phase nearly opposite to that of an aberration that decreases from the center of the liquid crystal cell halfway toward the periphery.

42. The liquid crystal optical element according to claim 38, wherein the concentric electrodes belonging to the second group of concentric electrodes have widths causing a voltage distribution, between the concentric electrodes and an opposing concentric electrode on the second transparent substrate, that generates an aberration having a phase nearly opposite to that of an aberration that increases from a midpoint, between the center of the liquid crystal cell and the periphery, to the periphery.

43. The liquid crystal optical element according to claim 38, wherein the power source unit, when correcting a spherical aberration of a disk with a small effective aperture of an objective lens, supplies the independent concentric electrode with a voltage between the voltage supplied to the concentric electrode among the concentric electrodes belonging to the first group of concentric electrodes that is located close to the independent concentric electrode and the voltage supplied to the concentric electrode among the concentric electrodes belonging to the second group of concentric electrodes that is located next to the independent concentric electrode.

44. The liquid crystal optical element according to claim 38, wherein resistance values of the resistors connecting every two concentric electrodes belonging to one group of concentric electrodes are the same.

45. A liquid crystal optical element comprising:

a liquid crystal cell having a first transparent substrate with a first electrode, a second transparent substrate with a second electrode, and a liquid crystal layer encapsulated between the first transparent substrate and the second transparent substrate; and a power source unit supplying a voltage to the first electrode and the second electrode, wherein depending on the voltage applied between the first electrode and the second electrode by the power source unit, in-plane refractive index distribution of the liquid crystal cell changes, the first electrode is composed of a plurality of concentric electrodes concentrically arranged from a center of the first transparent substrate toward a periphery of the first transparent substrate and the plurality of concentric electrodes making up the first electrode are divided into at least two groups of concentric electrodes, wherein the second electrode is composed of a plurality of concentric electrodes concentrically arranged from the center of the second transparent substrate toward the periphery and the plurality of concentric electrodes making up the second electrode are divided into at least two groups of concentric electrodes, the concentric electrodes that are adjacent among the concentric electrodes belonging to each group of concentric electrodes are connected through a resistor, a first correction unit that corrects spherical aberration of a disk with a large effective aperture of an objective lens is composed of all of the groups of concentric electrodes, and wherein a second correction unit that corrects the spherical aberration of the disk with a small effective aperture of the objective lens is composed of the group of concentric electrodes arranged from the center of the liquid crystal cell halfway toward the periphery, wherein an independent concentric electrode of a circular shape concentric with the concentric electrodes on the first transparent substrate is further provided on the first transparent substrate, independently without belonging to any group of concentric electrodes on the first transparent substrate, and wherein the independent concentric electrode is provided between two of the groups of concentric electrodes arranged on the first transparent substrate.

46. The liquid crystal optical element according to claim 45, wherein when among the plurality of groups of concentric electrodes provided on the first transparent substrate, the group of concentric electrodes arranged near the center of the liquid crystal cell is designated as a first group of concentric electrodes and the group of concentric electrodes arranged near the periphery of the liquid crystal cell is designated as a second group of concentric electrodes, and among the plurality of groups of concentric electrodes provided on the second transparent substrate, the group of concentric electrodes arranged near the center of the liquid crystal cell is designated as a third group of concentric electrodes and the group of concentric electrodes arranged near the periphery of the liquid crystal cell is designated as a fourth group of concentric electrodes, the first correction unit is composed of the first group of concentric electrodes, the second group of concentric electrodes, the third group of concentric electrodes, and the fourth group of concentric electrodes, and the second correction unit is composed of the first group of concentric electrodes and the third group of concentric electrodes.

47. The liquid crystal optical element according to claim 46, wherein the concentric electrodes belonging to the third group of concentric electrodes have widths causing a voltage distribution, between the concentric electrodes and the first group of concentric electrodes, that generates an aberration having a phase nearly opposite to that of an aberration that increases from the center of the liquid crystal cell halfway toward the periphery.

48. The liquid crystal optical element according to claim 46, wherein the concentric electrodes belonging to the second group of concentric electrodes have widths causing a voltage distribution, between the concentric electrodes and the fourth group of concentric electrodes, that generates an aberration having a phase nearly opposite to that of an aberration that decreases from a midpoint, between the center of the liquid crystal cell and the periphery, to the periphery.

49. The liquid crystal optical element according to claim 46, wherein the concentric electrodes belonging to the third group of concentric electrodes have widths causing a voltage distribution, between the concentric electrodes and the first group of concentric electrodes, that generates an aberration having a phase nearly opposite to that of an aberration that decreases from the center of the liquid crystal cell halfway toward the periphery.

50. The liquid crystal optical element according to claim 46, wherein the concentric electrodes belonging to the second group of concentric electrodes have widths causing a voltage distribution, between the concentric electrodes and the fourth group of concentric electrodes, that generates an aberration having a phase nearly opposite to that of an aberration that increases from a midpoint, between the center of the liquid crystal cell and the periphery, to the periphery.

51. The liquid crystal optical element according to claim 46, wherein the power source unit, when correcting a spherical aberration of a disk with a small effective aperture of an objective lens, supplies the independent concentric electrode with a voltage between the voltage supplied to the concentric electrode among the concentric electrodes belonging to the third group of concentric electrodes that is located close to the independent concentric electrode and the voltage supplied to the concentric electrode among the concentric electrodes belonging to the second group of concentric electrodes that is located next to the independent concentric electrode.

52. The liquid crystal optical element according to claim 45, wherein resistance values of the resistors connecting every two concentric electrodes belonging to one group of concentric electrodes are the same.

* * * * *